US012647793B2

(12) United States Patent
Rao et al.

(10) Patent No.: US 12,647,793 B2
(45) Date of Patent: Jun. 2, 2026

(54) METHOD FOR AUTHENTICATING TO A REMOTE SERVER USING SERVICE-SPECIFIC CREDENTIALS STORED IN THE eUICC

(71) Applicant: Nokia Technologies Oy, Espoo (FI)

(72) Inventors: Siddharth Prakash Rao, Espoo (FI); Alexandros Bakas, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 370 days.

(21) Appl. No.: 18/544,784

(22) Filed: Dec. 19, 2023

(65) Prior Publication Data

US 2025/0203372 A1 Jun. 19, 2025

(51) Int. Cl.
*H04W 12/30* (2021.01)
*H04W 8/20* (2009.01)
*H04W 12/04* (2021.01)

(52) U.S. Cl.
CPC ........... *H04W 12/35* (2021.01); *H04W 8/205* (2013.01); *H04W 12/04* (2013.01)

(58) Field of Classification Search
CPC ...... H04W 12/35; H04W 12/04; H04W 8/205
See application file for complete search history.

(56) References Cited

U.S. PATENT DOCUMENTS

| | | | | |
|---|---|---|---|---|
| 11,950,320 B2 * | 4/2024 | Lim | ...................... | H04W 8/183 |
| 2015/0163056 A1 * | 6/2015 | Nix | .................... | H04L 63/0435 |
| 2016/0286380 A1 * | 9/2016 | Long | ...................... | H04W 12/04 |
| 2017/0127264 A1 * | 5/2017 | Yang | ................... | H04L 63/0428 |
| 2018/0234837 A1 * | 8/2018 | Lee | ......................... | H04L 9/3247 |
| 2019/0218442 A1 * | 7/2019 | Elkatatny | ............... | E21B 41/02 |
| 2021/0400569 A1 * | 12/2021 | Dreiling | ............... | H04W 8/065 |
| 2023/0078765 A1 * | 3/2023 | Sharma | ................... | H04W 4/70 |
| | | | | 726/2 |

FOREIGN PATENT DOCUMENTS

WO WO-2016162690 A1 * 10/2016 ........... H04L 9/0841

* cited by examiner

*Primary Examiner* — William G Trost, IV
(74) *Attorney, Agent, or Firm* — McCarter & English, LLP; Joseph C. Drish

(57) ABSTRACT

An apparatus configured to receive, from a provisioning server, a request to create at least one sub-profile of at least one profile stored within an embedded universal integrated circuit card of the apparatus; wherein the request comprises encrypted subscription data comprising a symmetric key between a service provider and a user of the apparatus; store the symmetric key within the embedded universal integrated circuit card of the apparatus; and create the at least one sub-profile of the at least one profile stored within the embedded universal integrated circuit card of the apparatus; wherein the at least one sub-profile of the at least one profile stored within the embedded universal integrated circuit card of the apparatus is configured to be used to authenticate the user of the apparatus to the service provider with use of the symmetric key without involvement of a mobile network operator.

39 Claims, 10 Drawing Sheets

1100

1110 — storing at least one sub-profile of at least one profile stored within an embedded universal integrated circuit card 1120 — wherein the at least one sub-profile is configured to be used to authenticate a user of a user device to a service provider with use of a symmetric key between the service provider and the user without involvement of a mobile network operator 1130 — wherein the at least one sub-profile comprises subscription information related to a subscription of the user to the service provider 1140 — implementing, with the embedded universal integrated circuit card, a sub-profile companion applet comprising an interface to at least one software application of the user device, an interface to a software component that stores the symmetric key between the service

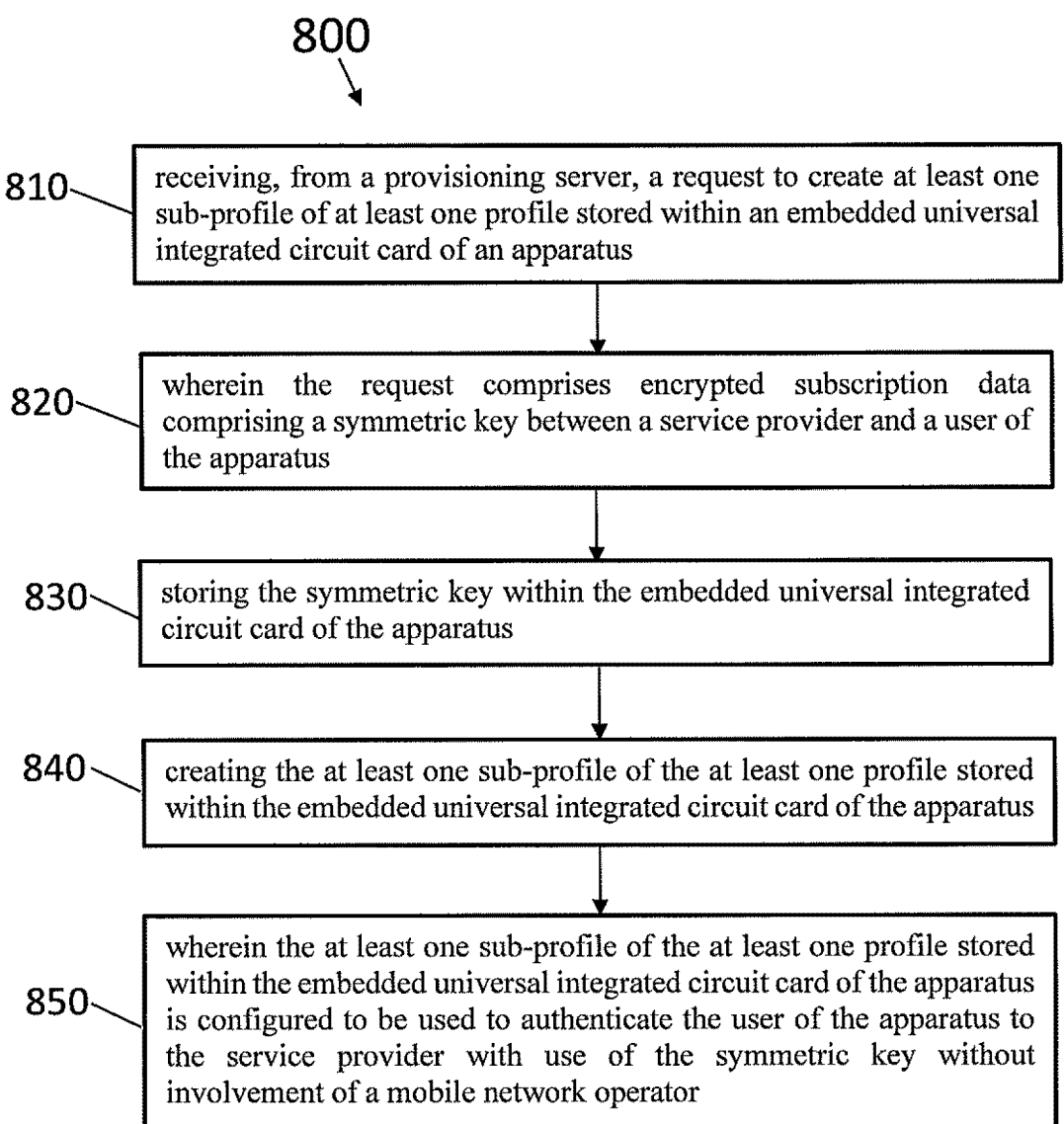

800

810 — receiving, from a provisioning server, a request to create at least one sub-profile of at least one profile stored within an embedded universal integrated circuit card of an apparatus 820 — wherein the request comprises encrypted subscription data comprising a symmetric key between a service provider and a user of the apparatus 830 — storing the symmetric key within the embedded universal integrated circuit card of the apparatus 840 — creating the at least one sub-profile of the at least one profile stored within the embedded universal integrated circuit card of the apparatus 850 — wherein the at least one sub-profile of the at least one profile stored within the embedded universal integrated circuit card of the apparatus is configured to be used to authenticate the user of the apparatus to the service provider with use of the symmetric key without involvement of a mobile network operator

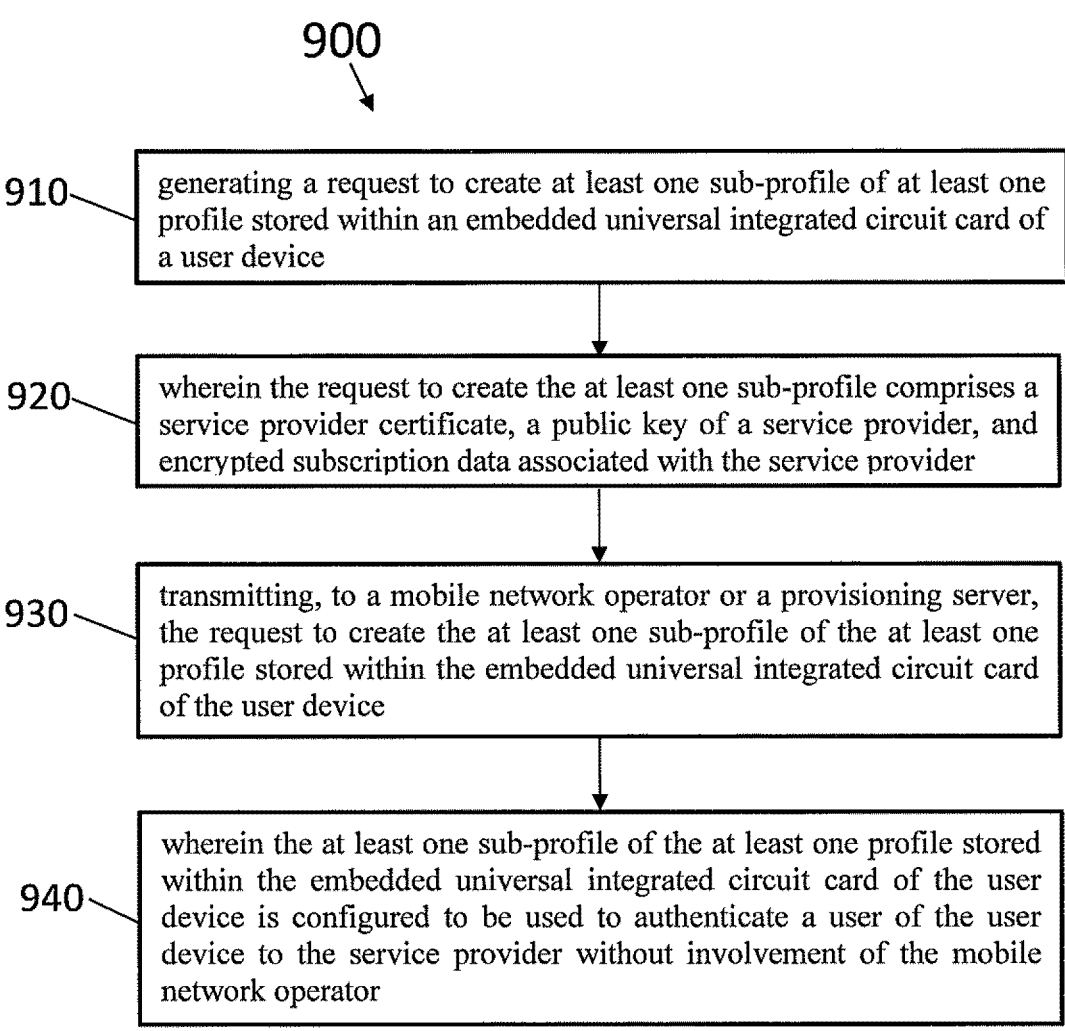

910 — generating a request to create at least one sub-profile of at least one profile stored within an embedded universal integrated circuit card of a user device 920 — wherein the request to create the at least one sub-profile comprises a service provider certificate, a public key of a service provider, and encrypted subscription data associated with the service provider 930 — transmitting, to a mobile network operator or a provisioning server, the request to create the at least one sub-profile of the at least one profile stored within the embedded universal integrated circuit card of the user device 940 — wherein the at least one sub-profile of the at least one profile stored within the embedded universal integrated circuit card of the user device is configured to be used to authenticate a user of the user device to the service provider without involvement of the mobile network operator

FIG. 9

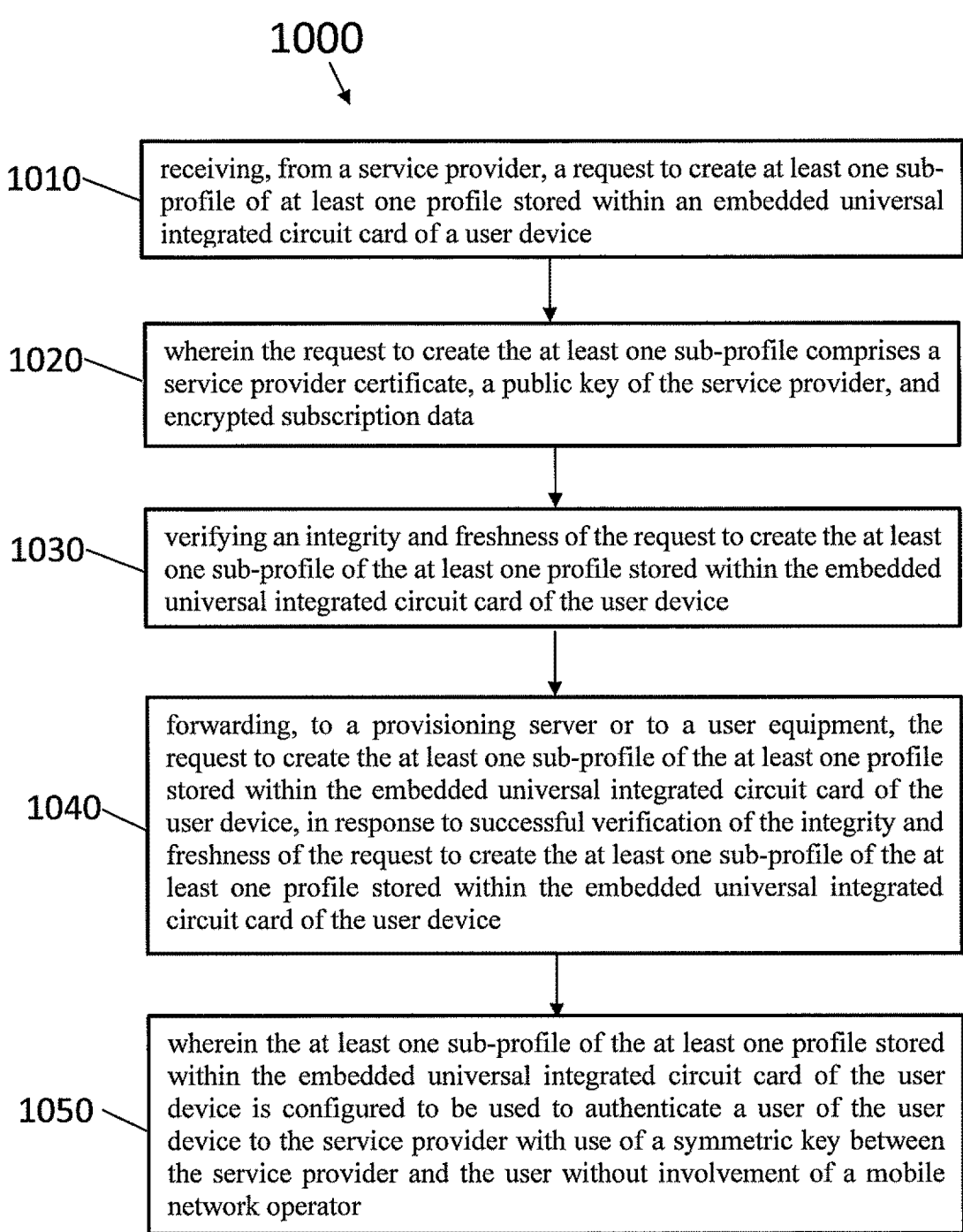

1000

1010 — receiving, from a service provider, a request to create at least one sub-profile of at least one profile stored within an embedded universal integrated circuit card of a user device 1020 — wherein the request to create the at least one sub-profile comprises a service provider certificate, a public key of the service provider, and encrypted subscription data 1030 — verifying an integrity and freshness of the request to create the at least one sub-profile of the at least one profile stored within the embedded universal integrated circuit card of the user device 1040 — forwarding, to a provisioning server or to a user equipment, the request to create the at least one sub-profile of the at least one profile stored within the embedded universal integrated circuit card of the user device, in response to successful verification of the integrity and freshness of the request to create the at least one sub-profile of the at least one profile stored within the embedded universal integrated circuit card of the user device 1050 — wherein the at least one sub-profile of the at least one profile stored within the embedded universal integrated circuit card of the user device is configured to be used to authenticate a user of the user device to the service provider with use of a symmetric key between the service provider and the user without involvement of a mobile network operator

FIG. 10

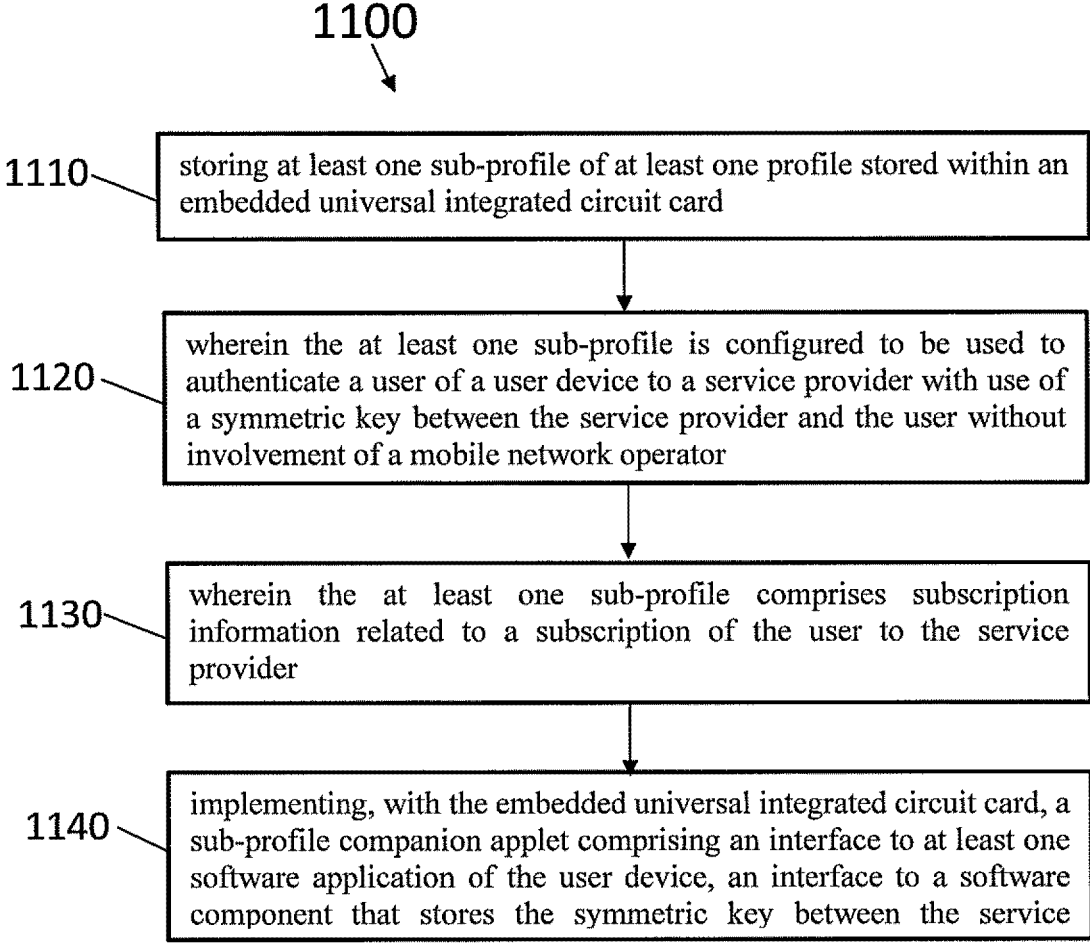

1100

1110 — storing at least one sub-profile of at least one profile stored within an embedded universal integrated circuit card 1120 — wherein the at least one sub-profile is configured to be used to authenticate a user of a user device to a service provider with use of a symmetric key between the service provider and the user without involvement of a mobile network operator 1130 — wherein the at least one sub-profile comprises subscription information related to a subscription of the user to the service provider 1140 — implementing, with the embedded universal integrated circuit card, a sub-profile companion applet comprising an interface to at least one software application of the user device, an interface to a software component that stores the symmetric key between the service

FIG. 11

METHOD FOR AUTHENTICATING TO A REMOTE SERVER USING SERVICE-SPECIFIC CREDENTIALS STORED IN THE eUICC

TECHNICAL FIELD

The examples and non-limiting example embodiments relate generally to communications and, more particularly, to a method for authenticating to a remote server using service-specific credentials stored in a eUICC.

BACKGROUND

It is known to implement security in a communication network by authenticating a user device.

SUMMARY

In accordance with an aspect, an apparatus includes at least one processor; and at least one non-transitory memory storing instructions that, when executed by the at least one processor, cause the apparatus at least to: receive, from a provisioning server, a request to create at least one sub-profile of at least one profile stored within an embedded universal integrated circuit card of the apparatus; wherein the request comprises encrypted subscription data comprising a symmetric key between a service provider and a user of the apparatus; store the symmetric key within the embedded universal integrated circuit card of the apparatus; and create the at least one sub-profile of the at least one profile stored within the embedded universal integrated circuit card of the apparatus; wherein the at least one sub-profile of the at least one profile stored within the embedded universal integrated circuit card of the apparatus is configured to be used to authenticate the user of the apparatus to the service provider with use of the symmetric key without involvement of a mobile network operator.

In accordance with an aspect, an apparatus includes at least one processor; and at least one non-transitory memory storing instructions that, when executed by the at least one processor, cause the apparatus at least to: generate a request to create at least one sub-profile of at least one profile stored within an embedded universal integrated circuit card of a user device; wherein the request to create the at least one sub-profile comprises a service provider certificate, a public key of a service provider, and encrypted subscription data associated with the service provider; and transmit, to a mobile network operator or a provisioning server, the request to create the at least one sub-profile of the at least one profile stored within the embedded universal integrated circuit card of the user device; wherein the at least one sub-profile of the at least one profile stored within the embedded universal integrated circuit card of the user device is configured to be used to authenticate a user of the user device to the service provider without involvement of the mobile network operator.

In accordance with an aspect, an apparatus includes at least one processor; and at least one non-transitory memory storing instructions that, when executed by the at least one processor, cause the apparatus at least to: receive, from a service provider, a request to create at least one sub-profile of at least one profile stored within an embedded universal integrated circuit card of a user device; wherein the request to create the at least one sub-profile comprises a service provider certificate, a public key of the service provider, and encrypted subscription data; verify an integrity and freshness of the request to create the at least one sub-profile of the at least one profile stored within the embedded universal integrated circuit card of the user device; and forward, to a provisioning server or to a user equipment, the request to create the at least one sub-profile of the at least one profile stored within the embedded universal integrated circuit card of the user device, in response to successful verification of the integrity and freshness of the request to create the at least one sub-profile of the at least one profile stored within the embedded universal integrated circuit card of the user device; wherein the at least one sub-profile of the at least one profile stored within the embedded universal integrated circuit card of the user device is configured to be used to authenticate a user of the user device to the service provider with use of a symmetric key between the service provider and the user without involvement of a mobile network operator.

In accordance with an aspect, an embedded universal integrated circuit card includes at least one sub-profile of at least one profile stored within the embedded universal integrated circuit card; wherein the at least one sub-profile is configured to be used to authenticate a user of a user device to a service provider with use of a symmetric key between the service provider and the user without involvement of a mobile network operator; wherein the at least one sub-profile comprises subscription information related to a subscription of the user to the service provider; and a sub-profile companion applet comprising an interface to at least one software application of the user device, an interface to a software component that stores the symmetric key between the service provider and the user, and an interface to a software component used to provision and manage the at least one sub-profile.

BRIEF DESCRIPTION OF THE DRAWINGS

The foregoing aspects and other features are explained in the following description, taken in connection with the accompanying drawings.

FIG. 8 is an example method, based on the examples described herein.

FIG. 9 is an example method, based on the examples described herein.

FIG. 10 is an example method, based on the examples described herein.

FIG. 11 is an example method, based on the examples described herein.

DETAILED DESCRIPTION OF EXAMPLE EMBODIMENTS

Figure 1:
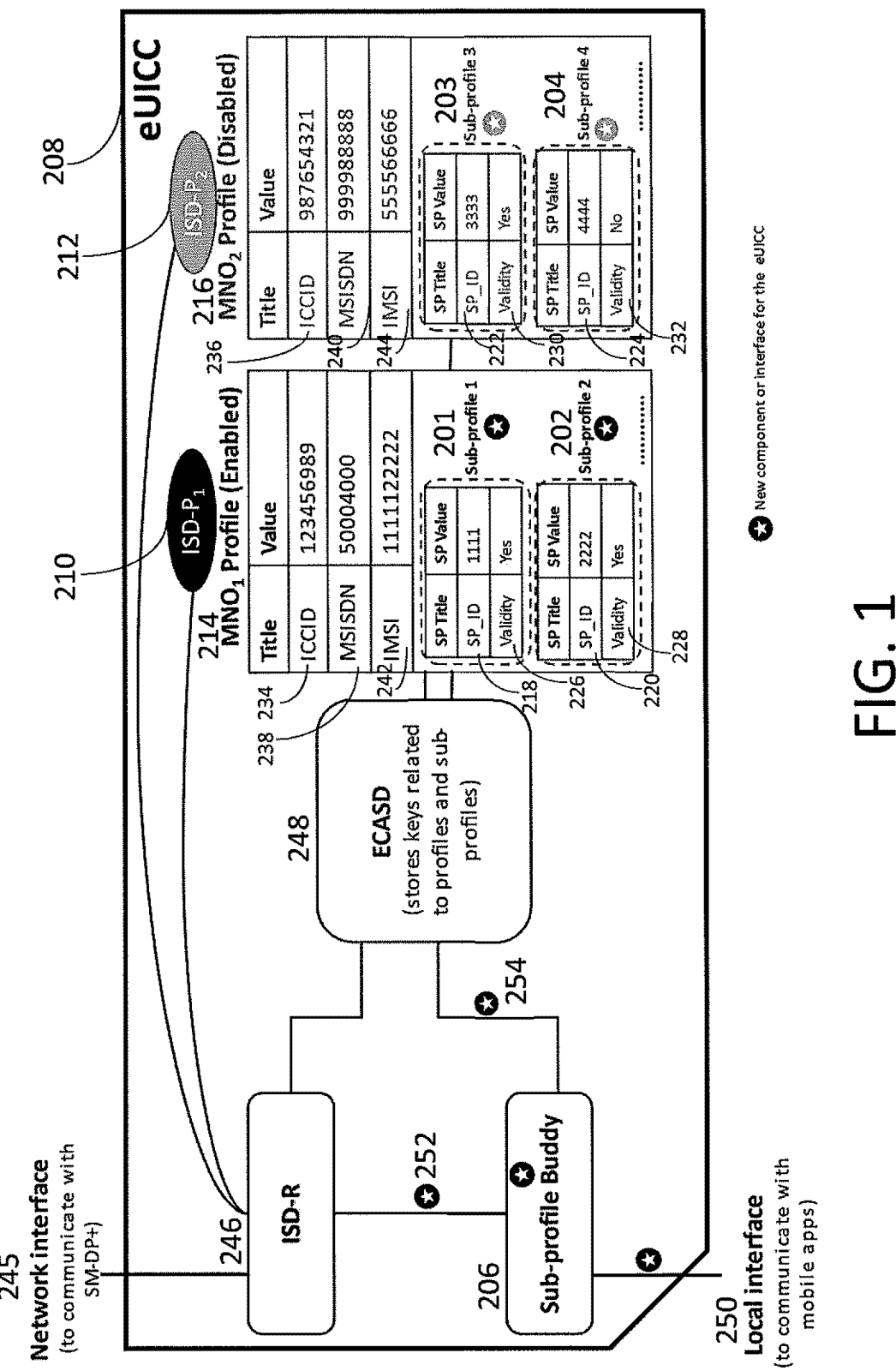
FIG. 1 shows an example representation of a sub-profile, a sub-profile buddy and other components and interfaces inside an eUICC.

The examples described herein relate to the concept of sub-profiles inside an eUICC and a method for a mobile application to interact with the sub-profiles.

A subscriber identity module (SIM) or embedded universal integrated circuit card (eUICC) is capable of secure storage and performing cryptographic operations. The eUICC on the user equipment (UE) is used for storing profiles and credentials provided by a mobile network operator (MNO), and for using them for authenticating a mobile subscriber to cellular networks. Traditionally, the eUICC has been a hardware chip that is provided by the MNO when a subscriber purchases cellular subscriptions. These physical, removable chips are replaced with an embedded SIM (eSIM) and integrated SIM (iSIM). The eSIM is a hardware-based SIM that uses a dedicated embedded circuit soldered into the UE, whereas the iSIM is embedded into the UE's permanent hardware using the system-on-a-chip architecture. An MNO can install profiles on an eSIM/iSIM using the GSMA remote SIM provisioning (RSP) protocol.

Irrespective of the type, the eUICC contains the following components that are related to the examples described herein in context (1-3):

1. Issuer Security Domain-Root (ISD-R), the component that allows remote provisioning and management of profiles from a cellular network.
2. eUICC Controlling Authority Security Domain (EC-ASD), the secure vault that stores sensitive information such as authentication keys.
3. Issuer Security Domain-Profile (ISD-P), the component that hosts the MNO profiles with MSISDN, IMSI, and other details.

The GSMA RSP specifications may be referred to for further details of the eUICC components and interfaces.

There is only one ISD-R and ECASD, but multiple unique ISD-Ps, on the eUICC. If multiple profiles or ISD-Ps, e.g., belonging to different MNOs, exist on the eUICC, then the ISD-R ensures that only one of them is active at any given time. Also, the ISD-R handles switching between the profiles when a user wishes to do so.

Placing multiple SIM profiles on a single eUICC and managing them one at a time has been a longstanding research and engineering effort in the telecommunications industry. However, simultaneously enabling or using multiple SIM profiles has only been a recent effort, and very few of the prior works have investigated them. For example, it is possible to create multiple logical interfaces, instead of physical ones, between profiles and the modem such that each profile can be simultaneously enabled and connected with a single modem. This solution considers profiles that are independent of each other, and the logical interface is to keep them active such that they can communicate with their respective mobile networks over cellular channels via the modem. The main shortcoming of this approach is that the profiles strictly belong to MNOs and are independent of each other. Furthermore, the logical interface does not provide communication between SIM profiles and an app. For such communication, GSMA has published requirements for Secured Applications for Mobile (SAM), where a SIM applet establishes communication between the eUICC and a companion app running on the mobile device. Here, both the applet and app pair are controlled by the MNO. While the methods described herein comply with the functional requirements of SAM, it differs significantly in the design. The main disadvantage of this approach is the creation of app-applet pair that overloads the eUICC unnecessarily, and it can be abstracted with some generalization of the SIM applet that securely mediates the communication with different apps. Prior to SAM, the GSMA SIM application toolkit (SAT or STK) was used for establishing the SIM to application communication, where only specialized apps on the mobile OS are managed by the MNOs. The goal of this approach was to provide limited SIM functionalities to the users, e.g., to display a menu for selecting value added services offered by the MNOs.

The eUICC is a secure storage component that can perform cryptographic operations. The standardized interfaces and components of the eUICC allow storing only MNO-specific data and to communicate only with the cellular networks. While this design decision complements security offered by the eUICC, it also limits what can be done with the eUICC. For example, despite the secure storage capabilities, it is not possible to store non-MNO data such as credentials and data related to mobile apps or the subscriber on the eUICC. Neither there is protocol support, nor provision on the eUICC design. On the other hand, the data stored on the eUICC cannot be accessed from software applications running on the UE's mobile OS, i.e., the mobile applications (also referred to as "mobile apps").

These limitations are addressed as follows. First, described herein is the concept of a sub-profile for storing non-MNO data on the eUICC. Second, described herein is a method—an additional component and interfaces on the eUICC—to facilitate secure communication with other existing components of the eUICC as well as with software applications running on the UE.

FIG. 1 highlights the new components and interfaces described herein. In particular, FIG. 1 shows an example representation of a sub-profile (such as sub-profile 1 201, sub-profile 2 202, sub-profile 3 203, and sub-profile 4 204), a sub-profile buddy 206, and other components and interfaces inside an eUICC 208.

The concept of a "sub-profile" is introduced and described herein. The sub-profile (201, 202, 203, 204) is a miniature profile inside the MNO's ISD-P (210, 212) or profile (214, 216) on the eUICC 208. Typically, the sub-profile (201, 202, 203, 204) belongs to a non-MNO entity which cannot have a profile of its own. The sub-profile contains key-value pairs, for example, of a unique identifier (i.e., sub-profile ID or SP_ID (218, 220, 222, 224)) and validity (226, 228, 230, 232). The ISD-P profile (210, 212) stores this non-sensitive information belonging to a third-party entity after the key-value pair it uses for its own operations such as ICCID (234, 236), MSISDN (238, 240) and IMSI (242, 244). As described herein, a sub-profile (201, 202, 203, 204) may be provisioned inside a main ISD-P profile (210, 212). Once stored, the information inside the sub-profile (201, 202, 203, 204) can be accessed by its host ISD-P profile (210, 212) by the MNO. Like an ISD-P (210, 212), a sub-profile (201, 202, 203, 204) can be queried by an ISD-R 246. The sensitive information, such as the secret keys belonging to the sub-profile provider is stored inside the ECASD 248 and host ISD-P (210, 212) has no access to it. These keys can only be queried by sub-profile buddy 206, another component described herein, on approval of the ISD-R 246.

As shown in FIG. 1, ISD-P1 hosts sub-profile 1 201 and sub-profile 2 202, and ISD-P2 hosts sub-profile 3 203 and sub-profile 4 204.

Second, described herein is a new component, namely a sub-profile buddy 206, that can interact with the existing components of eUICC 208, such as the ISD-R 246 and ECASD 248. This new component (the sub-profile buddy 206) can also interact with the software applications (i.e., the mobile apps) running on the UE 110 (refer to FIG. 5). This component does not have any network interface, which forbids an MNO or any other entity to directly interact with the eUICC 208 over the cellular network. Some restrictions are relaxed for the eUICC 208, such as allowing to communicate with a mobile app, while done in a secure way such that the herein described new components do not override the existing standards and working principles of the eUICC 208.

Two main distinguishing features of the examples described herein as compared to previous systems are as follows (1-2):

1. The cellular network 100 is needed only when provisioning the sub-profile 201, 202, 203, 204 as described herein for utilizing the standardized GSMA RSP infrastructure. This involves a non-MNO entity who issues the sub-profile and the MNO on whose ISD-P the sub-profile is hosted. Once the profile is installed, the sub-profile (201, 202, 203, 204) and the associated credential stored in the ECASD 248 is accessible locally via sub-profile buddy 206. This configuration does not require cellular gateways or a cellular network.
2. The prior application interfaces on the SIM are implemented based on the SIM application toolkit which allows building interactive SIM applications. Most of these applications use the cellular or SIM's functionalities, such as locking the IMEI, accessing the SIM health and cellular quality of service, and launching value-added services. SAT-applets can also setup a call or read the SMS. In the configuration defined and described herein, functions are independent of the traditional cellular functionalities of the SIM. Thus, although the sub-profile buddy 206 works similar to SAT-applets, the sub-profile buddy 206 extends the functionalities of SAT and works differently from all the previous works.

A list of embodiments described herein are as follows (1-8):

1. The concept and structure for storing a profile (referred to as a sub-profile 201, 202, 203, 204) inside the ISD-P profile (210, 212) of the eUICC 208.
2. A component, referred to as "sub-profile buddy" 206 or sub-profile companion applet 206, that interacts with ISD-R 246, ECASD 248, and software applications running on the mobile operating system using local interfaces.
3. A method for the sub-profile buddy 206 to maintain information about the sub-profiles (201, 202, 203, 204) from all active (enabled-210) and inactive (disabled-212) ISD-Ps in the eUICC 208.
4. A method (including via interface 252) for the sub-profile buddy 206 to interact with ISD-R 246.
5. A method (including via interface 254) for the sub-profile buddy 206 to interact with ECASD 248.
6. A method (including via interface 250) for the sub-profile buddy 206 to interact with software applications running on the mobile operating system, for example via location interface 250 for communicating with mobile applications.
7. A method for the sub-profile buddy 206 to perform verification of the data that it receives through embodiments 4, 5, and 6.
8. A method for the sub-profile buddy 206 to perform operations on the data that it receives through embodiments 4, 5, and 6

Embodiments 2 to 8 include creation of a new component (the sub-profile buddy 206) on the eUICC 208 and several local (i.e., without any external network capabilities) interfaces of the new component with other existing components of the eUICC 208.

The details of the functionalities of the new components, new interfaces, and changes to other components are further described herein.

Details of embodiment 2 (sub-profile buddy, a new component on the eUICC):

The component mentioned in embodiment 2, i.e., the sub-profile buddy 206, can perform at least the following functionalities.

Information storing: the sub-profile buddy 206 can maintain information about sub-profiles 201, 202, 203, 204 (as mentioned in embodiment 1) from all the ISD-Ps (210, 212) on the same eUICC 208, irrespective of whether the ISD-P is enabled (210) or disabled (212). This information is updated when a sub-profile is provisioned, removed, or edited through the ISD-R 246, for example, during the key establishment and revocation. No entities outside the UE 110 or on the eUICC 208 except the ISD-R 246 can control the sub-profile buddy 206. Thus, the sub-profile buddy 206 is a companion component to ISD-R 246 and to protocols as per key establishment described herein and authentication described herein.

Details of embodiments 4, 5, 6 (communicating with other components on the eUICC and outside the eUICC): the sub-profile buddy 206 does not have a communication interface that allows direct connection outside the UE 110, such as to the cellular networks or the MNO's backend from where it can be controlled. Instead, the sub-profile buddy 206 contains three independent local communication interfaces (252, 254, 250) with ISD-R 246 (as per embodiment 4), ECASD 248 (as per embodiment 5), and mobile apps (as per embodiment 6). Interface 250 is between the sub-profile buddy 206 of the eUICC 208 and to mobile apps of a device within which the eUICC 208 is stored, interface 252 is between the sub-profile buddy 206 and the ISD-R 246, and interface 254 is between the sub-profile buddy 206 and the ECASD 248. The separation of network interfaces (e.g. network interface 245) and local interfaces (250, 252, 254) and between the local interfaces (250, 252, 254) is to achieve security by isolating different kinds of communication directed to the sub-profile buddy 206.

Details of embodiment 7 (verification of the messages received from other components): the sub-profile buddy 206 can perform verification of the messages that it receives from the local communication interfaces (252, 254, 250) of embodiments 4, 5 and 6 from ISD-R 246, ECASD 248, and mobile apps, respectively. The verification functionality could include, for example, but is not limited to, non-cryptographic verification such as comparing the strings of specific parts of the message with the information that the sub-profile buddy stores (refer to "information storing" functionality of embodiment 2), and cryptographic verification such as comparing a checksum to verify the integrity of the received messages and other protocol-specific verification as described herein.

Details of embodiment 8 (performing operations on the data): the sub-profile buddy 206 can perform operations such as hashing, signing, encrypting, and decrypting based on symmetric and asymmetric cryptography building blocks. Sub-profile buddy 206 could do it independently, but also it can seek assistance from other components on the eUICC 208. For example, for security purposes, symmetric keys related to sub-profiles (201, 202, 203, 204) are stored on the ECASD 248; so, for any symmetric cryptographic operation, it is assumed the sub-profile buddy 206 is assisted by ECASD 248 to provide the keys. The sub-profile buddy 206 can also perform non-cryptographic operations, such as concatenation of the information it handles or output of the cryptographic operations it performs. These operations are to prepare the response that it sends to other components on the eUICC 208 or UE 110.

Local Communication Interfaces of Sub-Profile Buddy

Details of embodiment 4 (interface 252 with the ISD-R 246): Through the interface 252, the sub-profile buddy 206 communicates with the ISD-R 246, for example, to query about the sub-profiles (201, 202, 203, 204) stored in both enabled ISD-P 210 and disabled ISD-P 212 based on the sub-profile ID (i.e., SP_ID 218, 220, 222, 224). If the query results from ISD-R 246 are positive for the SP_ID (218, 220, 222, 224), then that confirms the existence and validity of a sub-profile with the given SP_ID. On this confirmation, the sub-profile buddy 206 can then request the ISD-R 246 to allow it to retrieve information, such as private keys, associated with the SP_ID (218, 220, 222, 224) from the ECASD 248.

Additionally, when a new sub-profile is provisioned on the eSIM/iSIM (or the eUICC 208), the ISD-R 246 informs the sub-profile buddy 206 through the local communication interface 252 mentioned in embodiment 4. Consequently, the sub-profile buddy 206 adds a new entry to its database with the sub-profile ID (SP_ID (222, 224, 226, 228)), the mobile app ID associated with the sub-profile (201, 202, 203, 204), and information about the ISD-P (210, 212) where the sub-profile (201, 202, 203, 204) is hosted. Similarly, when ISD-R 246 removes a sub-profile (201, 202, 203, 204) or an ISD-P (210, 212) from the eUICC 208, ISD-R 246 informs the sub-profile buddy 206 to update its records through the local communication interface 252 mentioned in embodiment 4.

Details of embodiment 5 (interface 254 with the ECASD 248): Through the interface 254, the sub-profile buddy 206 communicates with the ECASD 248 by providing the SP_ID (218, 220, 222, 224) to retrieve any associated information, such as private keys, stored on the ECASD 248. This action might require approval from ISD-R 246, as mentioned in the details of embodiment 4.

Details of embodiment 6 (interface 250 with software applications running on the UE 110 (i.e., mobile apps)): The component mentioned in embodiment 2, i.e., the sub-profile buddy 206, consists of a local communication interface 250 with the software applications running on the mobile OS of the UE 110 (i.e., the mobile apps). For example, the sub-profile buddy 206 receives communications related to authentication from the mobile apps, which are then subjected to verification. If the verification succeeds, the sub-profile buddy continues the authentication and sends the response messages back to the app.

Changes to other components of eUICC 208 and UE 110 to facilitate embodiments 1 to 8:

As described in the details of embodiment 1, the ISD-P (210, 212) accommodates data for the sub-profile (201, 202, 203, 204). This data is provisioned to the ISD-P (210, 212) through ISD-R 246, like GSMA RSP, but as per the key establishment protocol described herein.

As described in the details of embodiments 4 and 5, the ISD-R 246 and ECASD 248 both have an additional interface (252, 254) with the sub-profile buddy 206.

Furthermore, any components running outside the eUICC 208, such as software applications running on the mobile OS on the UE 110, can communicate with the sub-profile buddy 206 through the local interface 250 as per embodiment 6. The sub-profile buddy 206 and other components may communicate in a server and client model, respectively. More details about the communication over the local interface 250 (as per embodiment 6) between the sub-profile buddy 206 and the components outside the eUICC 208 are given in the authentication method described herein.

The examples described herein are potentially applicable to any products and service offerings involving GSMA RSP and ETSI MSS. The herein described examples help to reuse the infrastructure and to extend the current application of GSMA RSP to involve non-MNO entities to establish their profile (referred to as sub-profiles) inside an MNO's profile. While the MNO that hosts the sub-profile controls some aspects of the sub-profiles, the MNO cannot control what goes inside the sub-profile or access the contents in any way. The provision for a sub-profile and using the sub-profile for authenticating the end-users to non-MNO entities is more secure and efficient than MSS. On a high-level, MNOs can offer sub-profile provisioning and sub-profile hosting as services to commodity services. MNOs can monetize this new service offering to cater to new customers who otherwise would not require MNO infrastructure or services.

Accordingly, the examples described herein relate to secure connection using an iSIM or an eSIM. The examples described herein are related to 1) a profile ordering request id already being encrypted before leaving the MNO for SM-DP+ through ES2+ interface, 2) the eUICC performing more than one decryption operation upon receiving a request from SM-DP+, 3) the ECASD having multiple key entries for a single ISD-P, 4) the existence of profile-like content inside an ISD-P, 5) mobile apps, other than SIM toolkit, communicating with the eUICC, and 6) correlation between a non-MNO entity communicating with the MNO and MNO sending out a request to the SM-DP+ for profile ordering.

The examples described herein further relate to a method for establishing shared private information between a user's eUICC and remote servers.

A high-level description of the remote SIM provisioning (RSP) protocol is provided as follows. The protocol involves mainly two entities: the Subscription Manager-Data Preparation+ (SM-DP+) on the network side and the embedded universal integrated circuit card (eUICC) on the user's side.

The SM-DP+ is a remote provisioning server responsible for creating, downloading, and managing SIM profiles over a mobile network. The eUICC, on the other hand, is a collective reference to the non-removable and non-replaceable hardware component (such as the eSIM or iSIM), the secure storage, and other software components that facilitate remote provisioning. The eUICC contains Issuer Security Domain-Root (ISD-R), a software component that allows remote provisioning and management of profiles from a mobile network. More specifically, the ISD-R is responsible for verifying the certificate of the profile delivered from the SM-DP+. Also, if multiple profiles are stored on the eUICC, the ISD-R handles switching between them and ensuring that only one is enabled. The eUICC also contains a secure vault called eUICC Controlling Authority Security Domain (ECASD) that stores sensitive data such as authentication keys.

A GSMA Certificate Authority (CA) acts as a trusted entity that issues certificates to both the SM-DP+ and the manufacturer of the eUICC. The communication between the MNO and the SM-DP+ and between the SM-DP+ and the eUICC occurs over the ES2+ and the ES8+ interfaces, respectively. The communication endpoints of these interfaces mutually authenticate each other using a certificate chain containing the root certificate issued by the GSMA CA. They form a transport layer security (TLS) tunnel, which is assumed to be secure and free from adversaries.

RSP has three main phases as follows (1-3):

1. Profile ordering: An MNO orders a SIM Profile from the SM-DP+ server by sharing a mobile subscriber (user) identity and credentials. The created profile is called the provisional profile.

2. User-assisted initiation: The user triggers a request to the SM-DP+ server to initiate the profile download on its eUICC.

3. Profile downloading: The SM-DP+ provisions the profile already created for the user directly onto its eUICC through ISD-R, and stores the sensitive data (e.g., keys) in the ECASD.

The examples described herein extend GSMA (Global System for Mobile Communications Association) remote SIM Provisioning, where a non-MNO entity can use RSP to establish some shared credentials with a user's eUICC. These credentials are stored in the non-MNO's sub-profile as described herein. Described herein is the protocol that is executed between the non-MNO entity, the MNO, and a user's eUICC. The network infrastructure for the original RSP can be reused to run the solution described herein and the mobile devices do not have to undergo any changes. This means all parties can use the herein described solution immediately. It is a secure and privacy-friendly solution to exchange confidential credentials between a non-MNO entity and a mobile user. Despite the MNO's involvement in the protocol, these credentials are only known to the non-MNO entity and the user.

This is the first work that considers users downloading profiles of non-MNO entities to their eUICCs.

If an attacker can compromise a GSMA-certified RSP server, they may be able to clone a genuine SIM profile and provision it to other eUICCs. To this end, the SIM Profile Transparency Protocol (SPTP), a protocol accessible to both the eUICC and the MNO, may involve provisioning actions that leave a trail. In the approach described herein, while the profile of every non-MNO entity passes through the MNO, they are encrypted with a key stored within the target eUICC and hence the MNO cannot see them.

It may be possible to minimize the interaction between the UE and MNOs during the downloading of a profile. While this allows for a more scalable solution than the traditional RSP solution proposed by GSMA, it is more applicable to the M2M solution and more specifically, may be best suited for bulk activation of a fleet of devices.

A different version of RSP may be specifically tailored around enterprises. More specifically, they assume that an enterprise server can act as an intermediate between the SM-DP+ server and the users (in this case the employees of the enterprise). Hence, the enterprise server downloads profiles from the SM-DP+ server and subsequently distributes them to its employees according to their access rights.

The RSP protocol is a protocol that allows an MNO entity to create a profile on a user's eUICC. Described herein is an extension of the RSP protocol that allows a non-MNO entity to store several credentials on a user's eUICC by relying on that same protocol. Naturally, this protocol should involve the active involvement of the MNO. However, the main challenge is to design such a protocol in a way that while the MNO mediates the communication between the non-MNO entity and the user's eUICC, it does not learn anything about the data shared between the other parties.

Moreover, the protocol should be designed in such a way that it builds on the current RSP protocol and does not modify the current RSP protocol. This is particularly important for the protocol's immediate deployment as no major modifications would need to occur to the existing network infrastructure.

Figure 2:
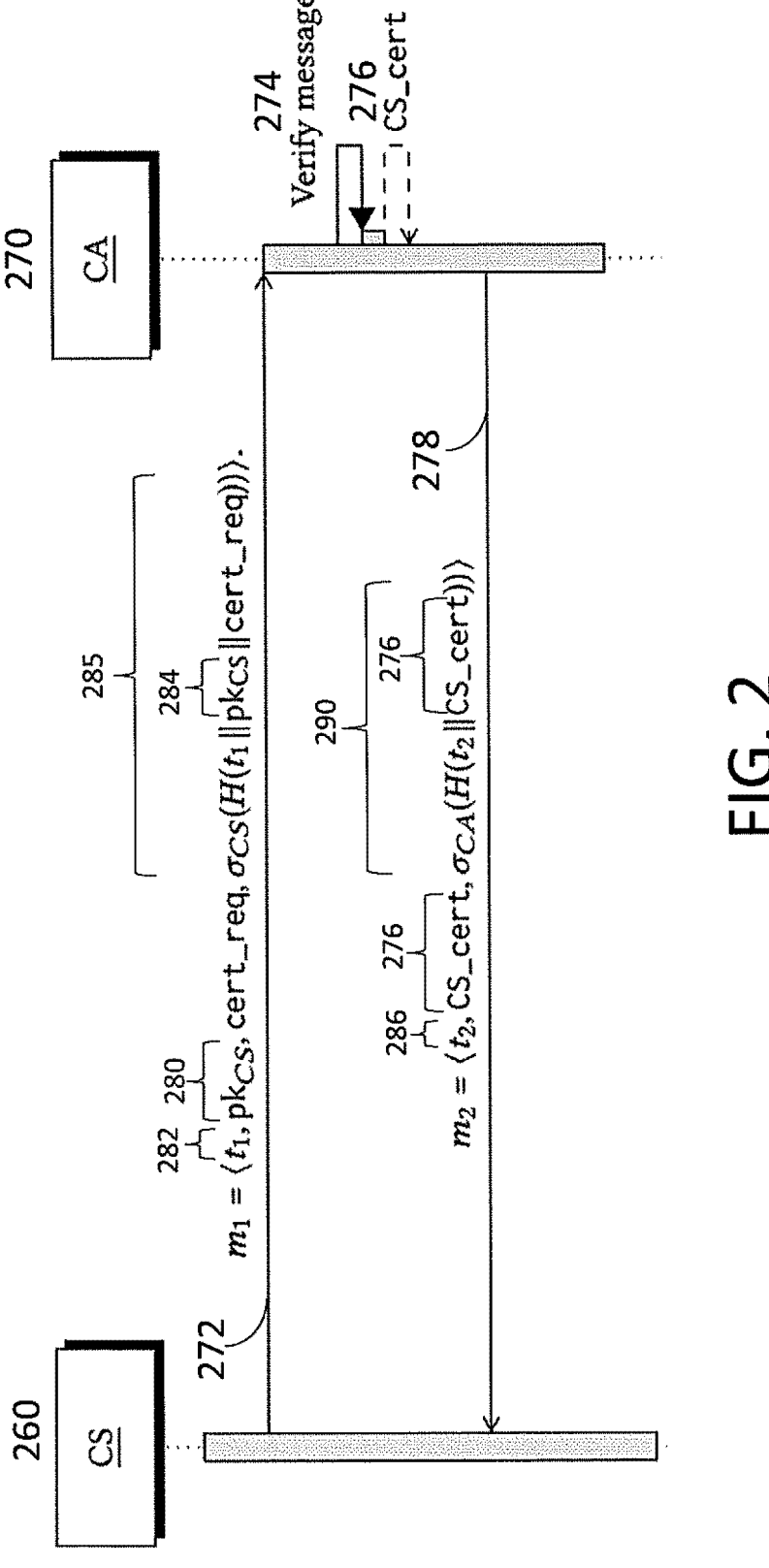
FIG. 2 shows an example registration phase.

Pre-Processing Phase:

In this phase, referring to FIG. 2, a CS 260 gets a certificate by CA 270. The CA 270 could be an MNO or a trusted third-party. The certificate here is the public key of the CS 260 signed by the CA 270. The commodity service (CS 260) may also be referred to as a service provider.

The steps are as follows:

First, at 272, the CS 260 sends the following packed inside a certificate request message $m_1$ which contains public key $pk_{CS}$ 280 of the CS 260, a freshness component 282 representing a time $t_1$ and the signature σ 285 using CS's private key $pk_{CS}$ 284.

For example, $m_1$ could be of the following form:

$$m_1 = \; < t_1, pk_{CS}, cert\_req, \sigma_{CS}(H(t_1\|pk_{CS}\|cert\_req)) >$$

On receiving the certificate request sent at 272, CA 270 tries to verify (274) the request for its integrity and freshness. For example, CA 270 can verify the signature 285 by decrypting the signature 285 with the public key of CS 260 and checking that the H obtained is the same when applying a hash function to the content of the message.

If the verification is successful, the CA 270 generates a certificate 276 that includes the public key of the CS 260 signed by the private key of the CA 270. Then, at 278, the CA 270 sends the response message $m_2$, which contains the certificate material 276 along with freshness component 286 representing a time $t_2$ and the signature σ 290 using CS_cert 276 generated by the CA 270 (for example, the signature σ 290 is calculated with a hash function H having arguments $t_2$ and CS_cert 276).

For example, $m_2$ could look like the following:

$$m_2 = \; < t_2, CS\_cert, \sigma_{CS}(H(t_2\|CS\_cert)) >$$

Registration phase: This is a two-party protocol between a user $u_i$ and CS 260. During registration, $u_i$ and CS agree on a subscription plan and $u_i$ provides CS with its public key $pk_{ui}$. Moreover, during this phase the user downloads CS's application on their mobile device. The CS generates (and stores in a database) subscription data that includes at least the following components (1-4):

1. a symmetric key ($K_{CS,u_i}$) that is eventually shared between CS 260 and the user $u_i$.

2. a unique ID for the user $id_{u_i}$ 3. a unique ID APP_ID for the app that the user installs. If the user installs the app on multiple devices, there are multiple app IDs mapped to the same user ID. The App id is bound to the user device.

4. billing info

The subscription data for example could have the following form:

$$sub\_data = \langle billing\_info, K_{CS,u_i}, id_{u_i}, APP\_ID \rangle$$

billing_info includes billing information for using the service, $K_{CS,u_i}$ is a symmetric key for a symmetric-key encryption scheme SKE, $id_{ui}$ is the unique identifier of the user $u_i$, and APP_ID is the unique identifier for CS's application on the user's device that contains the eSIM/iSIM.

Figure 3:
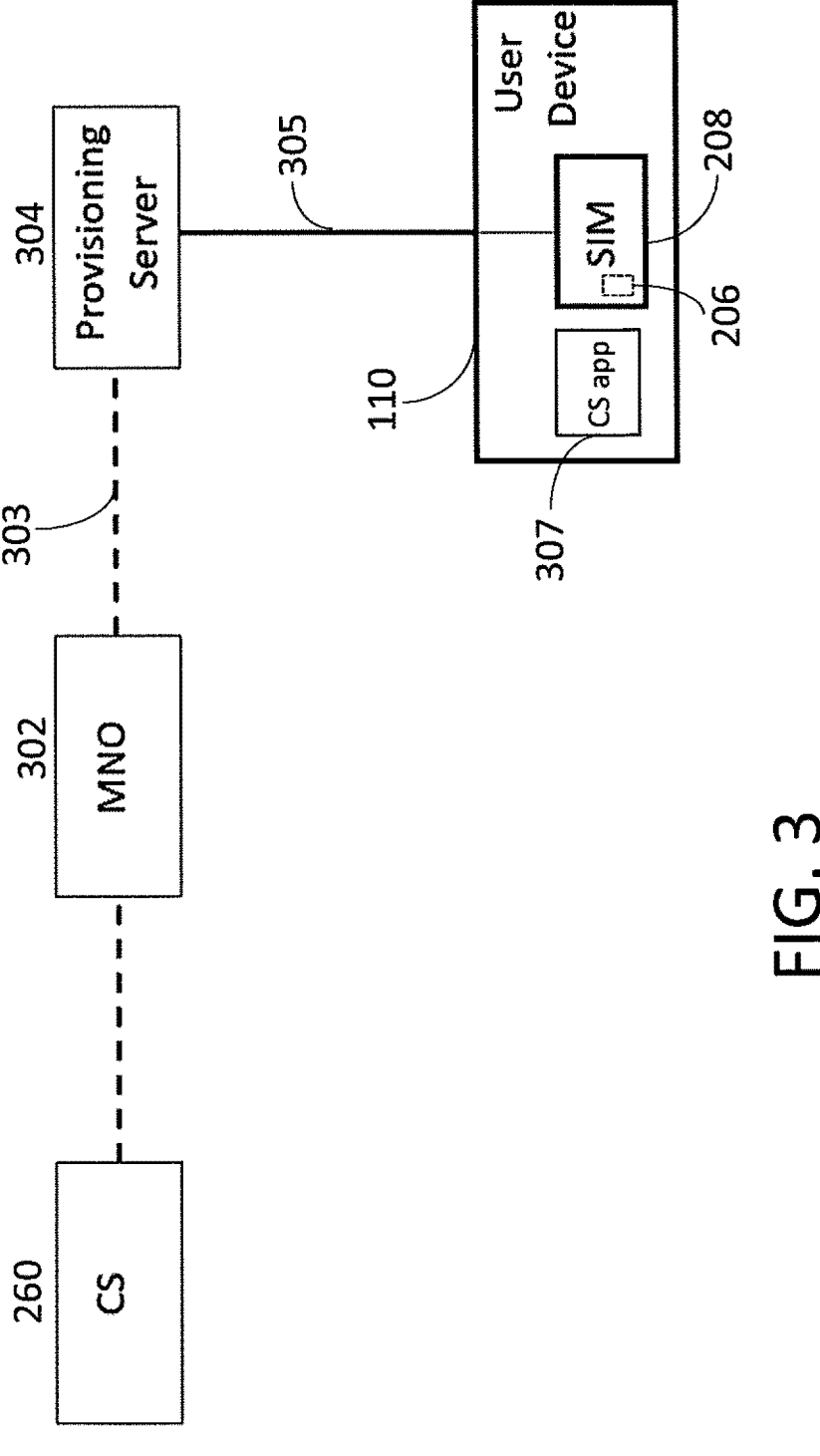
FIG. 3 is a block diagram showing entities involved in the data flow of the examples described herein.

FIG. 3 is a block diagram showing entities involved in the data flow of the examples described herein, including CS 260 (or service provider 260) MNO 302, provisioning server 304, and user device 110 having SIM or eUICC 208 comprising a sub-profile companion applet 206. The user device 110 includes a CS app 307.

Key-Establishment Phase:

On the CS 260 Side (1-4):

1. CS 260 pulls the sub_data that CS 260 created in registration phase.
2. CS 260 generates a random sub-profile ID, sub-profile_id, and sends an update to the user's mobile app on user device 110 that includes the sub-profile_id. This SP_ID is communicated later with the CS app 307 on the user device 110 over IP networks. By using this out of the band channel, the CS app 307 (over IP) and the CS sub-profile (over the MNO's channel) are bootstrapped.
3. CS 260 prepares a sub-profile provisioning request $m_3$ to the MNO 302 with the following components: i) freshness component, ii) unique ID of the user, iii) CS certificate (received in the pre-processing phase) and the public key of the CS, iv) CS 260 prepares the encrypted sub_profile material $c_{sub}$ with at least sub_data, sub-profile_id and encrypts it with a public key of the registered user. For example, the $c_{sub}$ could have the following form:

$$c_{sub} = PKE.Enc\left(pk_{u_i}, \text{sub\_data}\|\text{sub-profile\_id}\right)$$

With all the above parameters, the request $m_3$ could look, for example, like the following:

$$m_3 = \; < t_3, id_{u_i}, c_{sub}, \text{CS\_cert}, pk_{CS}, \sigma_{CS}\left(H\left(t_3\|id_{u_i}\|c_{sub}\|\text{CS\_cert}\|pk_{CS}\right)\right) > $$

4. CS 260 sends a sub-profile provisioning request $m_3$ to the MNO.

On the MNO 302 Side (1-2):

1. On receiving a sub-profile provisioning request, MNO 302 verifies (e.g. tries or attempts to verify) the sub-profile provisioning request for its integrity and freshness. The MNO 302 recovers the CS public key (used to sign) from the CA and then checks that the signature corresponds to the content of the message, in particular that the timestamp $t_3$ has not been altered.
2. If the verification is successful, MNO 302 forwards the sub-profile provisioning request to SM-DP+ 304 (SM-DP+ is an example of a provisioning server) through ES2+ interface 303.

On the SM-DP+ 304 Side (1-2):

1. On receiving a sub-profile provisioning request, the SM-DP+ 304 verifies (e.g. tries or attempts to verify) the request for its integrity and freshness. The SM-DP+ 304 verifies that the signature corresponds to the content of the message and that the "timestamp" $t_3$ has not been altered.
2. If the verification is successful, the SM-DP+ 304 forwards the message to the UE 110 over the ES8+ interface 305. This communication is encrypted using the symmetric key $K_{SM,u_i}$ that the SM-DP+ 304 shares with the user's eUICC 208 as specified in the original RSP. This is referred to as a re-encrypted sub-profile provisioning request.

On the User 110 Side (1-5):

1. On receiving the encrypted sub-profile provisioning request, eUICC 208 tries to verify the request for its integrity and freshness.
2. If the verification is successful, the user equipment (UE) 110 recovers $K_{SM,u_i}$ from its ECASD 248 and decrypts the second layer of encryption to get the sub-profile provisioning request.
3. Then, recover the user's private key and decrypt the sub-profile provisioning request. The user private key is used to decrypt encrypted sub-profile material $c_{sub}$.
4. The eUICC obtains sub-profile data (which may be referred to as sub_data) from decrypting $c_{sub}$ and thus the symmetric key $K_{CS,u_i}$ to be used between CS 260 and the user device 110. Key $K_{CS,u_i}$ is the shared key between user device 110 and CS 260. This key is stored in ECASD 248.
5. Then, MNO's profile (214, 216) on the eUICC 208 is modified to contain a sub-profile (201, 202, 203, 204) for CS 260.

Now, the user's ECASD 248 has the $K_{CS,u_i}$ which can be used for end-to-end authentication between the user (e.g. the user device 110) and the CS 260. In this case, the user can be authenticated to the CS 260 without requiring any password. Since the $K_{CS,u_i}$ is encrypted by the CS 260 before sending the $K_{CS,u_i}$ over the mobile network, neither the MNO 302, nor the SM-DP+ 304 has any knowledge of the $K_{CS,u_i}$.

CS 260 sends the encrypted sub_data to the MNO 302. The MNO 302 forwards the sub_data to the provisioning server 304 (e.g., SM-DP+) and orders the sub profile (201, 202, 203, 204) to be installed within the MNO's own SIM profile. CS 260 can also send the sub_data directly to the provisioning server 304, and it is sufficient if MNO 302 confirms the profile ordering.

Revocation Phase:

In this phase, the CS 260 wishes to revoke the user's access to its services. The steps are as follows:

On CS 260 Side (1-6):

1. Pull user's id, $id_{u_i}$ from local database
2. Add $id_{u_i}$ to revocation list $R_{CS}$
3. Generate a delete request del_req
4. Generate a freshness component $t_4$
5. With all the above components, the request $m_4$ could be like the following:

$$m_4 = \; < t_4, id_{u_i}, PKE.Enc\left(pk_{MNO}, id_{u_i}\|\text{del\_req}\right), \sigma_{CS}\left(\left(H'\right)\right) > $$

where H'=H($t_4$, $id_{u_i}$, PKE. Enc ($pk_{MNO}$, $id_{u_i}$||del_req)). In the above, public key encryption PKE.Enc( ) is an encryption of $id_{u_i}$ and del_req with use of the public key of the MNO, namely $pk_{MNO}$.

6. CS 260 sends the request $m_4$ to the MNO 302

On MNO 302 Side (1-2):

1. Upon receiving a deletion request $m_4$, MNO 302 tries to verify its integrity and freshness.
2. If the verification is successful, the MNO 302 initiates a run of the traditional RSP protocol to update its profile, ISD-P, on the user's side by deleting all CS-related data.

A further list of embodiments are described herein as follows:

9. A method to use non-MNO related data in RSP.

10. A method to involve a CS 260 (that is, a non-MNO entity) in RSP sub-profile provisioning (e.g. provisioning of sub-profiles 201, 202, 203, 204)

11. A method for the CS 260 to establish private login material with a customer's eUICC 208 in the form of sub-profile data (e.g. data of sub-profiles 201, 202, 203, 204).

12. A method to encrypt sub-profile data in a way agnostic to the MNO 302.

13. A method to transfer encrypted sub-profile data to the customer's eUICC 208 in a privacy-preserving manner.

14. A method to store sensitive login material from sub-profile data to ECASD 248.

15. Instructing ISD-R 246 to store the rest of the data inside a specific ISD-P that belongs to the MNO involved in the key establishment.

16. A method that relies on RSP to delete only sub-profile related data while keeping everything else within the specified ISD-P intact.

The apparatuses, devices, machines, articles of manufacture, and methods described herein as per the herein described embodiments, allow a CS 260 to create a sub-profile (201, 202, 203, 204), within an MNO's main profile, on a user's eUICC 208. Details are further provided herein for embodiments 9-16.

A user that has an active subscription with a particular MNO 302 can use the herein described protocol to establish login material with a CS 260. The first step includes the CS 260 contacting a CA 270 and requesting for a certificate 276 of its public key 280. Then, upon the registration of a user to the services offered by CS 260, the two parties agree on the details of the subscription and CS 260 proceeds with the generation of the subscription data. During this phase, the user (e.g. user equipment 110 or a user associated with UE 110) provides CS 260 with its own public key. Among others, subscription data involves a symmetric key that is eventually shared between the CS 260 and the user's eUICC 208. The user downloads the CS's application 307 on the user's UE 110 and CS 260 generates an application ID that is also included in the subscription data. This application may be used to bootstrap the application on the user's UE 110 with the CS's sub-profile (201, 202, 203, 204) on the eUICC.

The CS 260 first generates a sub-profile id (218, 220, 222, 224) and subsequently encrypts the subscription data along with the sub-profile id (218, 220, 222, 224) with the user's public key and sends the encrypted information to the MNO 302, along with some auxiliary data that are required to prevent attackers from modifying said information. Upon reception the MNO 302 relies on the existing RSP infrastructure to order a profile from SM-DP+ 304. To do so, the encrypted information, which neither MNO 302 nor SM-DP+ 304 can decrypt, is transferred from the MNO 302 to the SM-DP+ 304 through the ES2+ interface 303, as specified by GSMA. The SM-DP+ 304 then creates a profile and transmits the created profile to the user's eUICC 208 through the ES8+ interface 305 (specified by GSMA).

Upon reception, the ISD-R 246 retrieves the user's private key from ECASD 248, and decrypts the encrypted subscription data. The symmetric key that is included in the subscription data is stored in ECASD 248 along with the other cryptographic keys of the eUICC 208. For the rest of the data, some memory is allocated within the MNO's ISD-P (main MNO profile), to accommodate them. At this point, a CS sub-profile (201, 202, 203, 204) has been successfully created within MNO's profile.

To revoke a user's access to its services, CS 260 first recovers the user's id from its local database, and subsequently sends a deletion request to the MNO 302. The MNO 302 at this point initiates a run of the RSP protocol to update its profile on the user's eUICC 208, by removing all CS-related data.

Details of embodiment 12: the encryption is performed using a symmetric cryptosystem and the key shared between the non-MNO entity 260 and the user of UE 110.

Details of embodiment 13: the transfer of the encrypted data occurs with the assistance of the RSP protocol. The MNO 302 receives the encrypted data from the non-MNO entity 260 and initiates a run of the RSP protocol.

Details of embodiment 16: revocation occurs with the assistance of the RSP protocol. The MNO 302 receives the revocation request from the non-MNO entity 260 and initiates a run of the RSP protocol.

The examples described herein relate to a SIM-based authentication (SIMBA) protocol. In particular, the examples described herein relate to 1) the profile ordering request id being encrypted before leaving the MNO 302 for SM-DP+ 304 through ES2+ interface 303, 2) the eUICC 208 performing more than one decryption operation upon receiving a request from SM-DP+ 304, 3) the ECASD 248 having multiple key entries for a single ISD-P, 4) the existence of profile-like content inside an ISD-P (210, 212), 5) mobile apps, other than the SIM toolkit, communicating with the eUICC 208, and 6) signaling and interrelationships (e.g. correlation) being present via a non-MNO entity 260 communicating with the MNO 302 and the MNO 302 sending out a request to SM-DP+ 304 for profile ordering.

The examples described herein further relate to a method for authenticating to a remote server using service-specific credentials stored in the eUICC 208.

The embodiments described previously show how a non-MNO service (e.g. CS 260) can, in collaboration with an MNO 302, create a sub-profile (201, 202, 203, 204) within the profile (214, 216) of the MNO 302 on a user's device 110. Currently eSIM/iSIM profiles are only used to store MNO profiles (214, 216) and data that are required to authenticate a user using UE 110 to the cellular mobile network. However, the previously described embodiments herein show how non-MNO services (e.g. CS 260) can also benefit from the remote SIM provisioning (RSP) protocol and the eSIM/iSIM technology by using sub-profiles (201, 202, 203, 204). A non-MNO service (e.g. CS 260) can have a sub-profile (201, 202, 203, 204) on a user's device, storing data related to the service. To do so, the existence of a software component 206 (an applet 206) on the eUICC 208 accommodates all communication between the mobile app 307 of the non-MNO service (e.g. CS 260) on the user's device 110 and the corresponding sub-profile (one of 201, 202, 203, 204).

Also previously described herein is a design of a protocol that allows a non-MNO service (e.g. CS 260) to utilize the current RSP infrastructure to download data to its sub-profile (201, 202, 203, 204) on a user's device (110, 208) in a privacy-preserving way. The sub-profile (201, 202, 203, 204) can be updated with new data or even deleted simply by initiating runs of the RSP protocol (similarly to the management of main MNO profiles).

Described herein is a protocol that allows a user to use the data stored in the non-MNO's sub-profile (201, 202, 203, 204) to authenticate themselves to the non-MNO service.

In the delegated authentication methods used in standardized protocols such as GBA, BEST, and 5G AKMA, the MNO acts as an identity provider to external services to which a user must be authenticated. From a security and privacy point of view, there is however a downside. More specifically, there is just one set of a user's identifier and secrets issued by the MNO, and there is no possibility of having a service-specific credential that only the user and the service knows.

Another type of authentication method is based on the Mobile Signature Service (MSS) or Mobile PKI specified by ETSI. In this method, the MNO who issues the SIM card to its subscribers (i.e., mobile users) also issues a digital certificate. The certificate is stored in the MNO's directory in the network instead of the SIM. Then, the user enters a PIN on an applet on the SIM that authorizes the use of the certificate on the MNO's server for authentication. This method is typically used for signing into citizen services, such as government portals and healthcare. An example of this can be seen in Mobile ID, a federated identity and authentication system used in Finland. Unlike in phone-number-based authentication, the mobile certificate is not recycled, and the communication channels cannot be intercepted by a network adversary. However, the downside of MSS is that since the MNO is actively involved in every user authentication request, MSS-based authentication may be undesirable from a security and privacy point of view. The most notable similarity between GBA, BEST, 5G AKMA, and MSS is the active involvement of MNO in every user authentication request to an external service.

Finally, there are passwordless authentication mechanisms like FIDO that use mobile devices to securely store user credentials. In such mechanisms, the authentication credentials are stored within the trusted hardware components, and mobile apps access them using standard APIs implemented by the mobile OS. One of the limitations of this approach is that the mobile apps are running outside the boundaries of trusted hardware. An adversary can abuse this to extract the keys by exploiting the mobile OS or apps with access to the trusted hardware. In the examples described herein, both the authentication credentials and the software component handling them stay within the trusted boundaries of the eUICC, reducing the chances of the credentials being extracted by an adversary.

Described herein is an application involving the use of SIM technology for authenticating end-users to third-party commodity services on the public Internet. Despite having a unique user identifier and cryptographic capabilities, the use of SIM cards is limited to only authenticating to a mobile network. To fill this gap, the herein described protocol uses the full potential of SIM cards for authenticating a mobile user to a commodity service. Mobile Signature Services (MSS), an authentication method used mainly in the European region, has made a similar attempt. However, the herein described protocol offers better security and efficiency than MSS by obliviating the involvement of MNOs during the authentication and reducing unnecessary traffic toward mobile networks. Moreover, the incentive for the MNOs to use the herein described solution is that they can repurpose their existing RSP and MSS infrastructure but continue to generate revenue from authentication services. Similarly, non-MNO services can reuse the MSS infrastructure without getting affected by mobile network failures and delays and without the intervention of the MNOs during the authentication process.

It is assumed that a user and a non-MNO (or Commodity Service-CS) entity 260 have already run the key establishment protocol described herein with reference to FIG. 2 and FIG. 3. This would naturally use the applet component 206. Hence, the user and the non-MNO entity 260 already share a symmetric key $K_{CS,u_i}$.

As a result, the authentication phase described here is executed after the user and the non-MNO entity 260 have successfully created a sub-profile (201, 202, 203, 204) within the profile (214, 216) of an MNO 302 in the user's eUICC 208.

Figure 4:
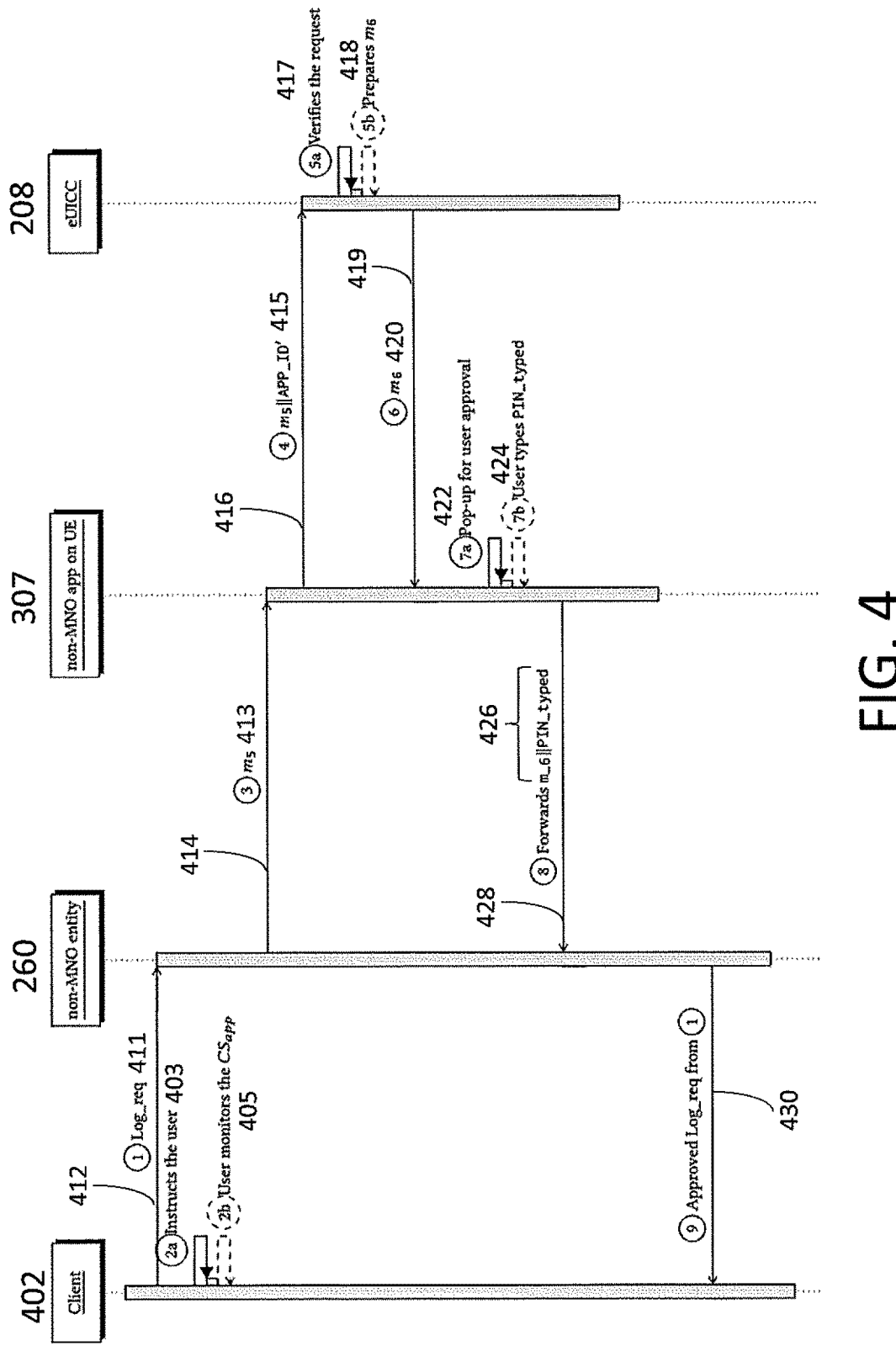
FIG. 4 shows an authentication phase, involving a client, a non-MNO entity, a non-MNO app, and a eUICC.

Authentication Phase:

Referring to FIG. 4, this process is initiated by a user $u_i$ that wishes to log in to the non-MNO entity 260 using its client 402. The client 402 can be either a browser or a mobile application (e.g. executed on UE 110 or not executed on the UE 110). As a first step, the user inputs its unique identifier $id_{u_i}$ such as a username. Then, the client 402 generates a pin, PIN and login request log_req 411, containing both $id_{u_i}$ and PIN (i.e., log_req=<$id_{u_i}$, PIN>). The log_req 411 is then forwarded (at 412) to the non-MNO 260. Upon reception, the non-MNO 260 retrieves $K_{CS,u_i}$ from its local database based on $id_{u_i}$, and generates the following message 413:

$$m_5 = \; <t_5, \; SKE.Enc(K_{CS,u_i}, PIN, APP\_ID), HMAC(K_{CS,u_i}, H_1)$$

where $H_1=(t_5\|APP\_ID\|SKE. Enc(K_{CS,u_i}, PIN, APP\_ID))$, $t_5$ is a freshness component, SKE. Enc denotes the encryption algorithm of a symmetric key encryption scheme SKE, and HMAC is a keyed hash function.

Also shown in FIG. 4 is the client 402 instructing (403) the user, and the user monitoring (405) the $CS_{app}$ 307.

At 414, this message 413 is then sent to the non-MNO app (or $CS_{app}$) 307 on the user's UE 110. Upon reception, the $CS_{app}$ 307 appends its APP_ID' to $m_5$ and thus, generate a message 415 of the form $m_5\|APP\_ID'$ that is forwarded (at 416) to the sub-profile companion applet 206 on the eUICC 208. The sub-profile companion applet 206 then (at 417) verifies the integrity of $m_5$ 413, along with its freshness, by verifying the HMAC using $K_{cs,u_i}$ and the timestamp respectively. If any verification fails, the sub-profile companion applet 206 outputs ⊥ (where denotes ⊥ verification failure) and aborts the protocol. Otherwise, the sub-profile companion applet 206 decrypts SKE. Enc ($K_{CS,u_i}$, PIN, APP_ID) and checks whether APP_ID=APP_ID'. If the equation does not hold, the sub-profile companion applet 206 outputs ⊥ and aborts the protocol and thus, prevents malicious behavior to redirect requests to different apps. On the other hand, if the equation holds, the sub-profile companion applet 206 generates (at 418) an accept message $m_6$ 420 and sends the accept $m_6$ message 420 (at 419) to the non-MNO app 307 on the UE 110. The accept message $m_6$ 420 is as follows:

$$m_6 = \; <t_6, \; SKE.Enc(K_{CS,u_i}, accept, PIN), HMAC(K_{CS,u_i}, H_2) >$$

where $H_2=t_6\|id_{u_i}\|SKE. Enc (K_{CS,u_i}, accept, PIN)$, and $t_6$ is a freshness component. In the notation above, the first argument of Enc( ) is the key used for encryption (in this case $K_{CS,u_i}$), the second argument of Enc( ) is the name of the message (in this case "accept"), and the third argument of Enc( ) is the target of the encryption (in this case the PIN).

At this point, at 422 a pop-up appears on the mobile app 307, asking from the user to type the PIN (where 424 corresponds to the user typing the PIN). If the user rejects the request, the non-MNO app 307 outputs ⊥ and aborts the protocol. Otherwise the app 307 appends the typed pin PIN_typed to $m_6$ 420 and thus, creates a message 426 of the form $m_6\|$PIN_typed. This message 426 is forwarded at 428 to the non-MNO 260 which first verifies the freshness and integrity of $m_6$ 420. If the verification succeeds, the non-MNO 260 decrypts $m_6$ 420 and checks that PIN=PIN_typed. If the equation does not hold, the non-MNO 260 outputs $\perp$ and aborts the protocol. Otherwise, the non-MNO 260 authenticates the user's client 402 and forwards (at 430) an approved log_req 411 to the client 402.

Accordingly, the flow of the authentication protocol is illustrated in FIG. 4. It is important to note that even if there does not exist an a priori secure channel between the eUICC 208 and the non-MNO app 307 on the UE 110, the communication is encrypted using $K_{CS,u_i}$ which is not known to the non-MNO app 307. While this may seem counter intuitive, the symmetric key $K_{CS,u_i}$ not being known to the non-MNO app 307 allows the protocol to guarantee security against malicious apps on the mobile device 110. Since $K_{CS,u_i}$, is only known to the non-MNO entity 260 and the eUICC 208, no malicious app can use $K_{CS,u_i}$ to forge messages.

Described herein is the straightforward scenario where a user types the correct PIN in the first attempt. Nevertheless a user might mistype the PIN; the herein described protocol also considers such human errors and allows a reasonable number of attempts before aborting. This feature is easily accommodated in the herein described design by extending the protocol as follows: upon generating the message $m_5$ 413, the non-MNO entity 260 also initializes a counter cnt=0 locally. Then, if the pin code that is appended to $m_6$ 420 by the non-MNO app 307 on the UE 110 is wrong, the non-MNO 260 sends the message 420 back to the app 307 requesting a new pin and increments its local counter by one. If, for example, the user has a total of three tries, the non-MNO entity 260 aborts the protocol if cnt>2. The number of tries and associated counter cnt are configurable.

Accordingly, FIG. 4 shows an example authentication phase, where the non-MNO app 307 and the eUICC 208 are from the same device (e.g. UE 110), whereas the client 402 can be anywhere. The client 402 can for example be a component within UE 110, or not be within UE 110.

For clarity, the user enters their ID $id_{u_i}$ while logging in on the client 402 (say a browser on a PC). The client 402 generates a PIN and shows it to the user. The $id_{u_i}$ entered by the user and the PIN generated by the client are sent to the CS server (also called non-MNO entity 260) in the log_req 411 message. Based on the $id_{u_i}$ received, the CS performs lookup in its database (a database of the CS server) for the corresponding APP ID. Hereon APP ID and PIN are used. There is therefore a mapping of user's ID to APP ID implemented as least with the database of the CS server.

A further list of embodiments described herein are as follows (17-20):

17. A method for a user to authenticate to a non-MNO entity 260 using their eUICC 208 without the active involvement of an MNO 302.

18. A method to provide end-to-end encryption to the communication between the non-MNO entity 260 and the user's eUICC 208.

19. A method for a user to authenticate to a non-MNO entity 260 in a passwordless way.

20. A method to protect the communication between the non-MNO entity 260 and potentially malicious apps on the UE 110.

A user that has an active subscription with a particular MNO can use the herein described protocol to authenticate themselves to a non-MNO entity in a passwordless manner.

The herein described protocol creates a strong binding between a user's subscription to a non-MNO service and their eUICC. The non-MNO entity can create a sub-profile on the user's eUICC and subsequently use the RSP protocol to deliver sensitive login information from the non-MNO entity to the sub-profile. Accordingly, described herein is a protocol that allows a user to use this sensitive login information to authenticate and login to a non-MNO service without the involvement of an MNO.

As a first step, the user can generate a login request from any device of their choosing and send it to the non-MNO entity. In doing so, the device locally generates a PIN code that is included in the login request. Upon receiving the request, the non-MNO entity uses the shared symmetric key to encrypt the pin code along with the app id on the user's device and subsequently forward the encrypted message to the corresponding app on the user's UE.

At this point the app appends its app id to the message in plaintext. Note that the app does not have access to the shared key and as a result, the app cannot see the PIN included in the message received by the non-MNO entity. This is important as it prevents malicious apps on the UE to tamper with messages in an attempt to fool users to authenticate themselves to services unwillingly. In particular, in the design described herein, the app acts only as a forwarder between the non-MNO entity and the user.

The app then forwards it to the eUICC, where the sub-profile companion applet (the herein described buddy module) is able to verify the integrity and freshness components cryptographically. To do so, the applet first contacts the ECASD component on the eUICC to retrieve the secret key that is shared between the non-MNO entity and the user. Upon the successful verification of the encrypted message, the applet generates an accept message, and also encrypts it with the shared key. This new message is then sent back to the app. At this point, a pop up then appears at the UE's screen requesting for a user to type the pin that was generated in the first step of the protocol. The user types the pin, which is appended to the encrypted message and forwarded to the non-MNO entity. Should the two pins match with each other, the non-MNO entity approves the login request by authenticating the user.

Details of embodiment 17: in contrast to other protocols (GBA, BEST, 5G AKMA, MSS), the herein described protocol allows a user to authenticate to a non-MNO service, without the active involvement of the MNO. This is achieved by utilizing the methods described herein, where a non-MNO service can allocate some memory within the profile of an MNO on a user's device (concept of sub-profile). Moreover, using RSP, the non-MNO entity can provide the sub-profile with data in a privacy-preserving way. This data can be used by the user to authenticate themselves to the non-MNO service in an end-to-end fashion.

Details of embodiment 18: the non-MNO service and the user are the only two entities that know the symmetric key used to protect the communication. Also, the shared key never leaves the eUICC.

Details of embodiment 19: the shared symmetric key is stored within the eUICC and is retrieved automatically by the sub-profile companion buddy upon a login request. Moreover, the user is only required to type a personal identification number (PIN) on the UE, which is shown on the client. Hence, no password (such as with using non-numeric characters) is involved during the authentication phase.

Details of embodiment 20: the non-MNO app only acts as a forwarder between the non-MNO entity and the user's eUICC. Should a malicious app attempt to tamper with the exchanged messages, this is detectable with overwhelming probability due to the cryptographic properties of the encryption scheme and the keyed hashed function that ensures integrity of the messages.

The method described herein relates to 1) the MNO not being involved in the authentication process, 2) the communication between the app and the eSIM/iSIM being mediated via a sub-profile companion applet on the eUICC, 3) the ECASD having multiple key entries for a single ISD-P, 4) the existence of profile-like content inside an ISD-P, and 5) mobile apps, other than the SIM toolkit, communicating with the eUICC.

Figure 5:
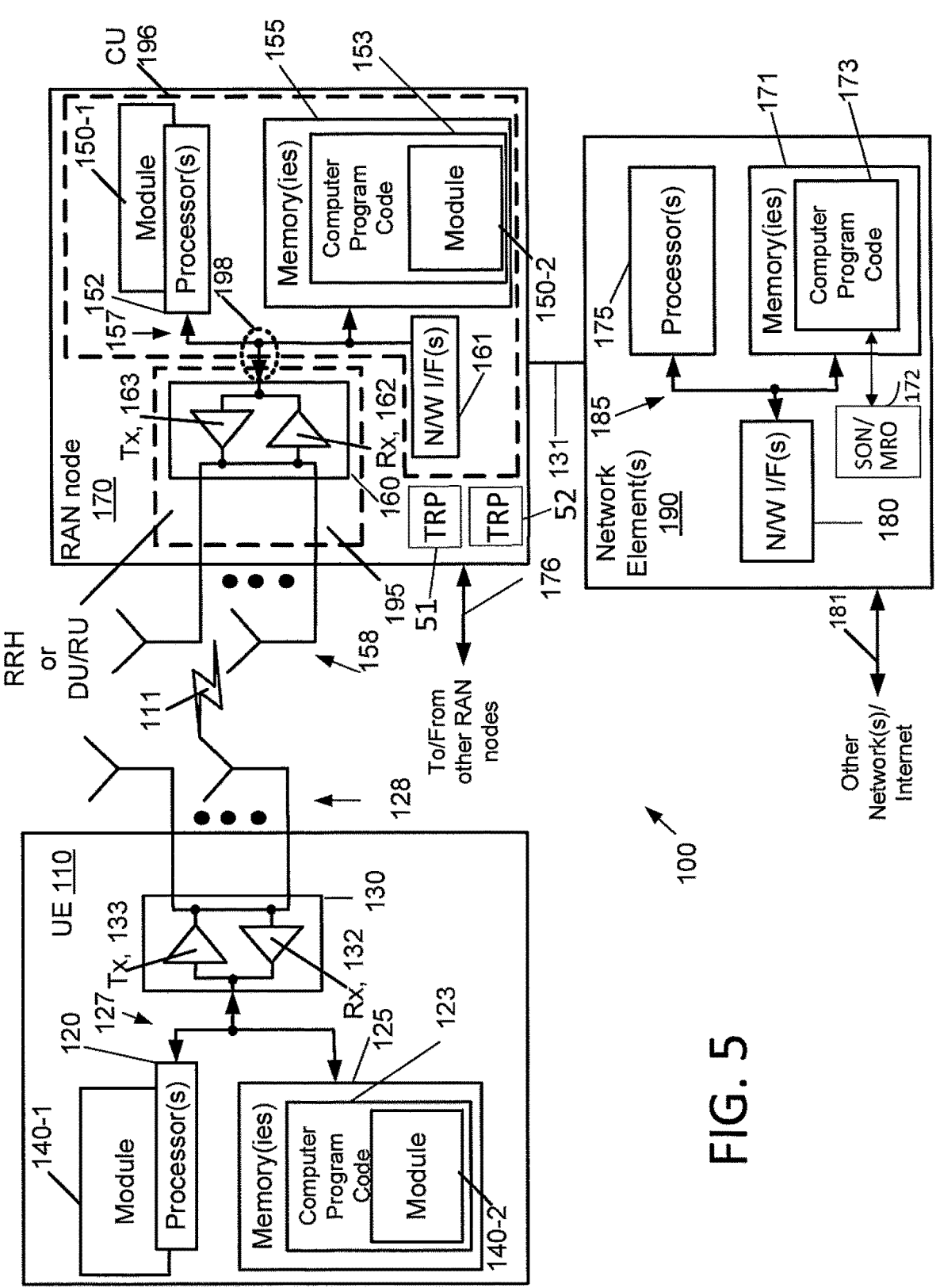
FIG. 5 is a block diagram of one possible and non-limiting system in which the example embodiments may be practiced.

Turning to FIG. 5, this figure shows a block diagram of one possible and non-limiting example in which the examples may be practiced. A user equipment (UE) 110, radio access network (RAN) node 170, and network element(s) 190 are illustrated. In the example of FIG. 5, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access for wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface (such as connection 131) to a 5GC (such as, for example, the network element(s) 190). The ng-eNB is a node providing E-UTRA user plane and control plane protocol terminations towards the UE, and connected via the NG interface (such as connection 131) to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that control the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell may be supported with one gNB-DU 195, or one cell may be supported/shared with multiple DUs under RAN sharing. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, one or more memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU 196) of the RAN node 170 to the RRH/DU 195. Reference 198 also indicates those suitable network link(s).

A RAN node/gNB can comprise one or more TRPs to which the methods described herein may be applied. FIG. 5 shows that the RAN node 170 comprises TRP 51 and TRP 52, in addition to the TRP represented by transceiver 160. Similar to transceiver 160, TRP 51 and TRP 52 may each include a transmitter and a receiver. The RAN node 170 may host or comprise other TRPs not shown in FIG. 5.

A relay node in NR is called an integrated access and backhaul node. A mobile termination part of the IAB node facilitates the backhaul (parent link) connection. In other words, the mobile termination part comprises the functionality which carries UE functionalities. The distributed unit part of the IAB node facilitates the so called access link (child link) connections (i.e. for access link UEs, and backhaul for other IAB nodes, in the case of multi-hop IAB). In other words, the distributed unit part is responsible for certain base station functionalities. The IAB scenario may follow the so called split architecture, where the central unit hosts the higher layer protocols to the UE and terminates the control plane and user plane interfaces to the 5G core network.

It is noted that the description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (mobility management entity)/SGW (serving gateway) functionality. Such core network functionality may include SON (self-organizing/optimizing network) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. Computer program code 173 may include SON and/or MRO functionality 172.

The wireless network 100 may implement network virtualization, which is the process of combining hardware and software network resources and network functionality into a single, software-based administrative entity, or a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, non-transitory memory, transitory memory, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various example embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback devices having wireless communication capabilities, internet appliances including those permitting wireless internet access and browsing, tablets with wireless communication capabilities, head mounted displays such as those that implement virtual/augmented/mixed reality, as well as portable units or terminals that incorporate combinations of such functions. The UE 110 can also be a vehicle such as a car, or a UE mounted in a vehicle, a UAV such as e.g. a drone, or a UE mounted in a UAV. The user equipment 110 may be terminal device, such as mobile phone, mobile device, sensor device etc., the terminal device being a device used by the user or not used by the user.

UE 110, RAN node 170, and/or network element(s) 190, (and associated memories, computer program code and modules) may be configured to implement (e.g. in part) the methods described herein. Thus, computer program code 123, module 140-1, module 140-2, and other elements/features shown in FIG. 5 of UE 110 may implement user equipment related aspects of the examples described herein. Similarly, computer program code 153, module 150-1, module 150-2, and other elements/features shown in FIG. 5 of RAN node 170 may implement gNB/TRP related aspects of the examples described herein. Computer program code 173 and other elements/features shown in FIG. 5 of network element(s) 190 may be configured to implement network element related aspects of the examples described herein.

Figure 6:
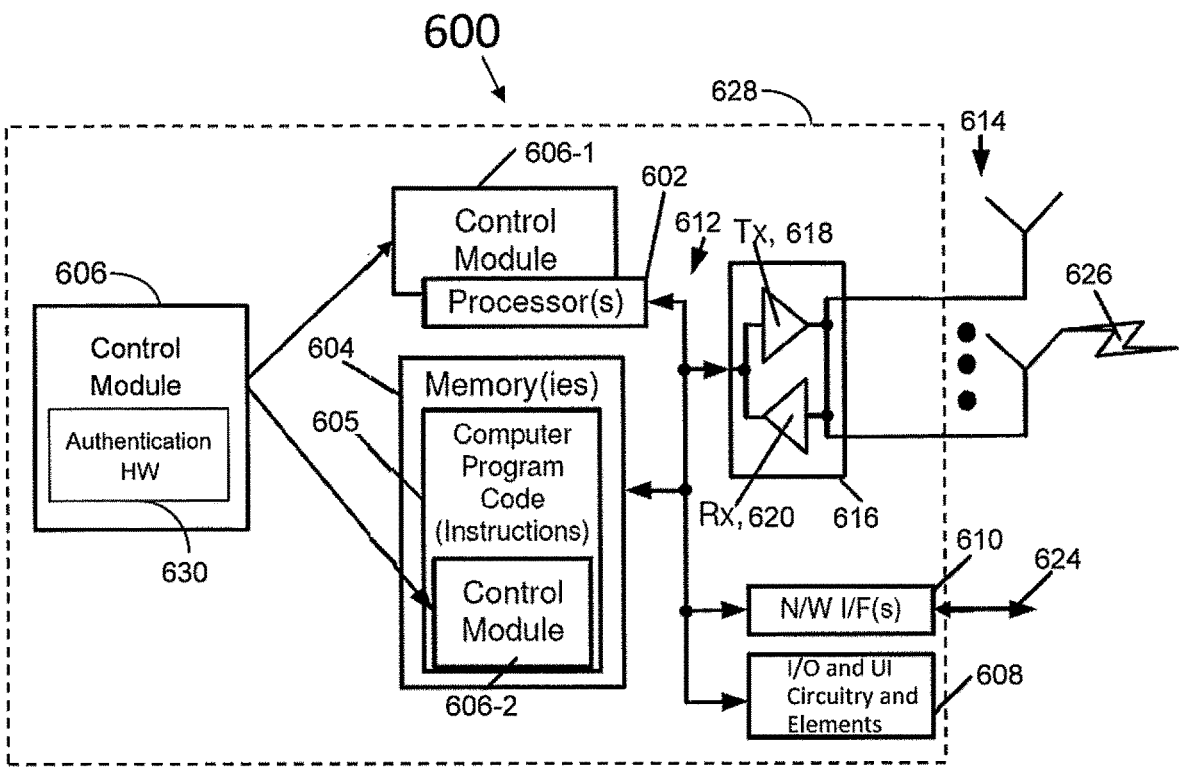
FIG. 6 is an example apparatus configured to implement the examples described herein.

FIG. 6 is an example apparatus 600, which may be implemented in hardware, configured to implement the examples described herein. The apparatus 600 comprises at least one processor 602 (e.g. an FPGA and/or CPU), one or more memories 604 including computer program code 605, the computer program code 605 having instructions to carry out the methods described herein, wherein the at least one memory 604 and the computer program code 605 are configured to, with the at least one processor 602, cause the apparatus 600 to implement circuitry, a process, component, module, or function (implemented with control module 606) to implement the examples described herein. The memory 604 may be a non-transitory memory, a transitory memory, a volatile memory (e.g. RAM), or a non-volatile memory (e.g. ROM). Authentication hardware (HW) 630 of the control module implements the herein described aspects related to authentication.

The apparatus 600 includes a display and/or I/O interface 608, which includes user interface (UI) circuitry and elements, that may be used to display aspects or a status of the methods described herein (e.g., as one of the methods is being performed or at a subsequent time), or to receive input from a user such as with using a keypad, camera, touch-screen, touch area, microphone, biometric recognition, one or more sensors, etc. The apparatus 600 includes one or more communication e.g. network (N/W) interfaces (I/F(s)) 610. The communication I/F(s) 610 may be wired and/or wireless and communicate over the Internet/other network(s) via any communication technique including via one or more links 624. The link(s) 624 may be the link(s) 131 and/or 176 from FIG. 5. The link(s) 131 and/or 176 from FIG. 5 may also be implemented using transceiver(s) 616 and corresponding wireless link(s) 626. The communication I/F(s) 610 may comprise one or more transmitters or one or more receivers.

The transceiver 616 comprises one or more transmitters 618 and one or more receivers 620. The transceiver 616 and/or communication I/F(s) 610 may comprise standard well-known components such as an amplifier, filter, frequency-converter, (de) modulator, and encoder/decoder circuitries and one or more antennas, such as antennas 614 used for communication over wireless link 626.

The control module 606 of the apparatus 600 comprises one of or both parts 606-1 and/or 606-2, which may be implemented in a number of ways. The control module 606 may be implemented in hardware as control module 606-1, such as being implemented as part of the one or more processors 602. The control module 606-1 may be implemented also as an integrated circuit or through other hardware such as a programmable gate array. In another example, the control module 606 may be implemented as control module 606-2, which is implemented as computer program code (having corresponding instructions) 605 and is executed by the one or more processors 602. For instance, the one or more memories 604 store instructions that, when executed by the one or more processors 602, cause the apparatus 600 to perform one or more of the operations as described herein. Furthermore, the one or more processors 602, the one or more memories 604, and example algorithms (e.g., as flowcharts and/or signaling diagrams), encoded as instructions, programs, or code, are means for causing performance of the operations described herein.

The apparatus 600 to implement the functionality of control 606 may be UE 110, RAN node 170 (e.g. gNB), or network element(s) 190. Thus, processor 602 may correspond to processor(s) 120, processor(s) 152 and/or processor(s) 175, memory 604 may correspond to one or more memories 125, one or more memories 155 and/or one or more memories 171, computer program code 605 may correspond to computer program code 123, computer program code 153, and/or computer program code 173, control module 606 may correspond to module 140-1, module 140-2, module 150-1, and/or module 150-2, and communication I/F(s) 610 and/or transceiver 616 may correspond to transceiver 130, antenna(s) 128, transceiver 160, antenna(s) 158, N/W I/F(s) 161, and/or N/W I/F(s) 180. Alternatively, apparatus 600 and its elements may not correspond to either of UE 110, RAN node 170, or network element(s) 190 and their respective elements, as apparatus 600 may be part of a self-organizing/optimizing network (SON) node or other node, such as a node in a cloud.

Apparatus 600 may also correspond to CS 260 or non-MNO entity 260, MNO 302, provisioning server 304, or client 420. In synchronization with FIG. 3, apparatus 600 may comprise a SIM or eUICC 208, which SIM or eUICC 208 of the apparatus 600 may have an applet 206 (sub-profile companion).

The apparatus 600 may also be distributed throughout the network (e.g. 100) including within and between apparatus 600 and any network element (such as a network control element (NCE) 190 and/or the RAN node 170 and/or UE 110).

Interface 612 enables data communication and signaling between the various items of apparatus 600, as shown in FIG. 6. For example, the interface 612 may be one or more buses such as address, data, or control buses, and may include any interconnection mechanism, such as a series of lines on a motherboard or integrated circuit, fiber optics or other optical communication equipment, and the like. Computer program code (e.g. instructions) 605, including control 606 may comprise object-oriented software configured to pass data or messages between objects within computer program code 605. The apparatus 600 need not comprise each of the features mentioned, or may comprise other features as well. The various components of apparatus 600 may at least partially reside in a common housing 628, or a subset of the various components of apparatus 600 may at least partially be located in different housings, which different housings may include housing 628.

Figure 7:
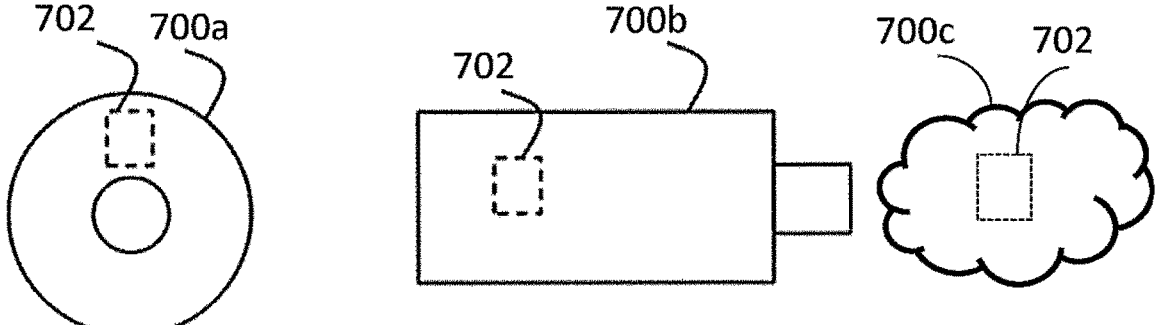
FIG. 7 shows a representation of an example of non-volatile memory media used to store instructions that implement the examples described herein.

FIG. 7 shows a schematic representation of non-volatile memory media 700*a* (e.g. computer/compact disc (CD) or digital versatile disc (DVD)) and 700*b* (e.g. universal serial bus (USB) memory stick) and 700*c* (e.g. cloud storage for downloading instructions and/or parameters 702 or receiving emailed instructions and/or parameters 702) storing instructions and/or parameters 702 which when executed by a processor allows the processor to perform one or more of the steps of the methods described herein. Instructions and/or parameters 702 may represent a non-transitory computer readable medium.

FIG. 8 is an example method 800, based on the example embodiments described herein. At 810, the method includes receiving, from a provisioning server, a request to create at least one sub-profile of at least one profile stored within an embedded universal integrated circuit card of an apparatus. At 820, the method includes wherein the request comprises encrypted subscription data comprising a symmetric key between a service provider and a user of the apparatus. At 830, the method includes storing the symmetric key within the embedded universal integrated circuit card of the apparatus. At 840, the method includes creating the at least one sub-profile of the at least one profile stored within the embedded universal integrated circuit card of the apparatus. At 850, the method includes wherein the at least one sub-profile of the at least one profile stored within the embedded universal integrated circuit card of the apparatus is configured to be used to authenticate the user of the apparatus to the service provider with use of the symmetric key without involvement of a mobile network operator. Method 800 may be performed with UE 110, SIM 208, client 402, non-MNO app 307, eUICC 208, or apparatus 600.

FIG. 9 is an example method 900, based on the example embodiments described herein. At 910, the method includes generating a request to create at least one sub-profile of at least one profile stored within an embedded universal integrated circuit card of a user device. At 920, the method includes wherein the request to create the at least one sub-profile comprises a service provider certificate, a public key of a service provider, and encrypted subscription data associated with the service provider. At 930, the method includes transmitting, to a mobile network operator or a provisioning server, the request to create the at least one sub-profile of the at least one profile stored within the embedded universal integrated circuit card of the user device. At 940, the method includes wherein the at least one sub-profile of the at least one profile stored within the embedded universal integrated circuit card of the user device is configured to be used to authenticate a user of the user device to the service provider without involvement of the mobile network operator. Method 900 may be performed with CS 260 (e.g. a non-MNO entity), one or more network elements 190, or apparatus 600.

FIG. 10 is an example method 1000, based on the example embodiments described herein. At 1010, the method includes receiving, from a service provider, a request to create at least one sub-profile of at least one profile stored within an embedded universal integrated circuit card of a user device. At 1020, the method includes wherein the request to create the at least one sub-profile comprises a service provider certificate, a public key of the service provider, and encrypted subscription data. At 1030, the method includes verifying an integrity and freshness of the request to create the at least one sub-profile of the at least one profile stored within the embedded universal integrated circuit card of the user device. At 1040, the method includes forwarding, to a provisioning server or to a user equipment, the request to create the at least one sub-profile of the at least one profile stored within the embedded universal integrated circuit card of the user device, in response to successful verification of the integrity and freshness of the request to create the at least one sub-profile of the at least one profile stored within the embedded universal integrated circuit card of the user device. At 1050, the method includes wherein the at least one sub-profile of the at least one profile stored within the embedded universal integrated circuit card of the user device is configured to be used to authenticate a user of the user device to the service provider with use of a symmetric key between the service provider and the user without involvement of a mobile network operator. Method 1000 may be performed with MNO 302, provisioning server 304, one or more network elements 190, or apparatus 600.

FIG. 11 is an example method 1100, based on the example embodiments described herein. At 1110, the method includes storing at least one sub-profile of at least one profile stored within an embedded universal integrated circuit card. At 1120, the method includes wherein the at least one sub-profile is configured to be used to authenticate a user of a user device to a service provider with use of a symmetric key between the service provider and the user without involvement of a mobile network operator. At 1130, the method includes wherein the at least one sub-profile comprises subscription information related to a subscription of the user to the service provider. At 1140, the method includes implementing, with the embedded universal integrated circuit card, a sub-profile companion applet comprising an interface to at least one software application of the user device, an interface to a software component that stores the symmetric key between the service provider and the user, and an interface to a software component used to provision and manage the at least one sub-profile. Method 1100 may be performed with UE 110, SIM 208, client 402, non-MNO app 307, eUICC 208, or apparatus 600.

The following examples are provided and described herein.

Example 1. An apparatus including: at least one processor; and at least one non-transitory memory storing instructions that, when executed by the at least one processor, cause the apparatus at least to: receive, from a provisioning server, a request to create at least one sub-profile of at least one profile stored within an embedded universal integrated circuit card of the apparatus; wherein the request comprises encrypted subscription data comprising a symmetric key between a service provider and a user of the apparatus; store the symmetric key within the embedded universal integrated circuit card of the apparatus; and create the at least one sub-profile of the at least one profile stored within the embedded universal integrated circuit card of the apparatus; wherein the at least one sub-profile of the at least one profile stored within the embedded universal integrated circuit card of the apparatus is configured to be used to authenticate the user of the apparatus to the service provider with use of the symmetric key without involvement of a mobile network operator.

Example 2. The apparatus of example 1, wherein the instructions, when executed by the at least one processor, cause the apparatus at least to: receive, from the service provider with a service provider application of the apparatus, a first message associated with a request of the user to log in to the service provider and a generated personal identification number; wherein the first message comprises an encryption of a first application identifier and an encryption of the generated personal identification number; generate, using the service provider application of the apparatus, a second message comprising a second application identifier appended to the first message; forward, using the service provider application of the apparatus, the second message to the embedded universal integrated circuit card; verify, with a sub-profile companion applet of the embedded universal integrated circuit card using the stored symmetric key between the service provider and the user of the apparatus, an integrity and freshness of the first message, based on the forwarded second message; and determine to deny the user access to the service provider, in response to the sub-profile companion applet failing to verify the integrity and freshness of the first message.

Example 3. The apparatus of example 2, wherein the instructions, when executed by the at least one processor, cause the apparatus at least to: retrieve the stored symmetric key between the service provider and the user of the apparatus from an embedded universal integrated circuit card controlling authority security domain.

Example 4. The apparatus of any of examples 2 to 3, wherein the instructions, when executed by the at least one processor, cause the apparatus at least to: receive, from the user, a unique identifier of the user and the generated personal identification number; generate the request of the user to log in to the service provider, the request comprising the unique identifier of the user and the generated personal identification number; and transmit, to the service provider, the request of the user to log in to the service provider;

wherein the first application identifier is based on mapping between the unique identifier of the user and the first application identifier.

Example 5. The apparatus of any of examples 2 to 4, wherein: the symmetric key is not known to the service provider application of the apparatus, and the generated personal identification number is not visible to the service provider application of the apparatus, or the symmetric key is not able to be decrypted by the service provider application of the apparatus, and the generated personal identification number is not visible to the service provider application of the apparatus.

Example 6. The apparatus of any of examples 2 to 5, wherein the instructions, when executed by the at least one processor, cause the apparatus at least to: determine, using the sub-profile companion applet, whether the first application identifier matches the second application identifier; determine to deny the user access to the service provider, in response to the first application identifier not matching the second application identifier; and forward, from the sub-profile companion applet to the service provider application of the apparatus, an accept message, in response to the first application identifier matching the second application identifier; wherein the accept message comprises the generated personal identification number encrypted with the symmetric key between the service provider and the user of the apparatus.

Example 7. The apparatus of example 6, wherein the instructions, when executed by the at least one processor, cause the apparatus at least to: encrypt the generated personal identification number with the symmetric key between the service provider and the user of the apparatus; and generate the accept message, including within the accept message the generated personal identification number encrypted with the symmetric key between the service provider and the user of the apparatus.

Example 8. The apparatus of any of examples 6 to 7, wherein the instructions, when executed by the at least one processor, cause the apparatus at least to: generate, with the service provider application, a request for the user to enter a user personal identification number; determine to deny the user access to the service provider, in response to the user failing to enter the user personal identification number or mistyping the user personal identification number for a number of attempts to enter the user personal identification number; generate a third message comprising the user personal identification number appended to the accept message; and forward the third message to the service provider, wherein the third message is configured to be used with the service provider to authenticate the user.

Example 9. The apparatus of any of examples 1 to 8, wherein the instructions, when executed by the at least one processor, cause the apparatus at least to: receive, from the user, a unique identifier of the user; generate a personal identification number; present the personal identification number to the user; and transmit, to a server of the service provider, the unique identifier of the user and the generated personal identification number.

Example 10. The apparatus of any of examples 1 to 9, wherein the instructions, when executed by the at least one processor, cause the apparatus at least to: retrieve a private key of the user; decrypt the encrypted subscription data; and store the decrypted subscription data within the at least one profile of the embedded universal integrated circuit card.

Example 11. The apparatus of any of examples 1 to 10, wherein the encrypted subscription data is not able to be decrypted by the provisioning server or the mobile network operator.

Example 12. The apparatus of any of examples 1 to 11, wherein the instructions, when executed by the at least one processor, cause the apparatus at least to: verify an integrity and freshness of the request to create the sub-profile within the at least one profile stored within the embedded universal integrated circuit card; wherein the at least one sub-profile is created within the at least one profile of the embedded universal integrated circuit card, in response to the integrity and freshness of the request to create the sub-profile within the at least one profile stored within the embedded universal integrated circuit card being verified.

Example 13. The apparatus of any of examples 1 to 12, wherein the at least one profile stored within the embedded universal integrated circuit card comprises a profile of the mobile network operator.

Example 14. The apparatus of any of examples 1 to 13, wherein the instructions, when executed by the at least one processor, cause the apparatus at least to: maintain, using a sub-profile companion applet of the embedded universal integrated circuit card, information about a first sub-profile of an enabled issuer security domain profile stored within the embedded universal integrated circuit card; and maintain, using the sub-profile companion applet of the embedded universal integrated circuit card, information about a second sub-profile of a disabled issuer security domain profile stored within the embedded universal integrated circuit card.

Example 15. The apparatus of any of examples 1 to 14, wherein the instructions, when executed by the at least one processor, cause the apparatus at least to: transmit, to the service provider, a request to subscribe the user to the service provider; wherein the at least one sub-profile of the at least one profile stored within the embedded universal integrated circuit card of the apparatus is created in response to the user being subscribed to the service provider; and store a service provider application within the apparatus, in response to the user being subscribed to the service provider.

Example 16. The apparatus of any of examples 1 to 15, wherein the instructions, when executed by the at least one processor, cause the apparatus at least to: communicate, using a sub-profile companion applet of the embedded universal integrated circuit card, with at least one software component of the embedded universal integrated circuit card and at least one software application of the apparatus.

Example 17. The apparatus of example 16, wherein the at least one software component comprises at least one of: an issuer security domain root, or an embedded universal integrated circuit card controlling authority security domain.

Example 18. The apparatus of any of examples 16 to 17, wherein the sub-profile companion applet does not have a communication interface that allows direct connection outside the apparatus to a cellular network or the mobile network operator.

Example 19. The apparatus of any of examples 1 to 18, wherein the service provider comprises a commodity service.

Example 20. An apparatus including: at least one processor; and at least one non-transitory memory storing instructions that, when executed by the at least one processor, cause the apparatus at least to: generate a request to create at least one sub-profile of at least one profile stored within an embedded universal integrated circuit card of a user device; wherein the request to create the at least one sub-profile comprises a service provider certificate, a public key of a service provider, and encrypted subscription data associated with the service provider; and transmit, to a mobile network operator or a provisioning server, the request to create the at least one sub-profile of the at least one profile stored within the embedded universal integrated circuit card of the user device; wherein the at least one sub-profile of the at least one profile stored within the embedded universal integrated circuit card of the user device is configured to be used to authenticate a user of the user device to the service provider without involvement of the mobile network operator.

Example 21. The apparatus of example 20, wherein the instructions, when executed by the at least one processor, cause the apparatus at least to: receive, from a client of the user of the user device, a request for the user to log in to the service provider, wherein the request comprises a unique identifier of the user and a generated personal identification number; determine an application identifier associated with a service provider application of the user device, based on a mapping between the unique identifier of the user and the application identifier associated with the service provider application of the user device, the mapping stored in a database associated with the apparatus; encrypt the generated personal identification number and the application identifier associated with the service provider application of the user device, using a symmetric key between the service provider and the user; transmit, to the service provider application of the user device, a first message comprising the encrypted generated personal identification number and the encrypted application identifier; receive, from the service provider application of the user device, a second message comprising a user personal identification number entered by the user; determine whether the generated personal identification number matches the user personal identification number entered by the user; and authenticate the client of the user, in response to the generated personal identification number matching the user personal identification number entered by the user.

Example 22. The apparatus of example 21, wherein authenticating the client of the user comprises granting to the client of the user access to a service provided with the service provider.

Example 23. The apparatus of any of examples 21 to 22, wherein the instructions, when executed by the at least one processor, cause the apparatus at least to: retrieve, from a local database, the symmetric key between the service provider and the user, based on the unique identifier of the user.

Example 24. The apparatus of any of examples 21 to 23, wherein the instructions, when executed by the at least one processor, cause the apparatus at least to: retrieve, from an embedded universal integrated circuit card controlling authority security domain, the symmetric key between the service provider and the user.

Example 25. The apparatus of any of examples 21 to 24, wherein the instructions, when executed by the at least one processor, cause the apparatus at least to: authenticate the client of the user to the service provider without use of a password and without use of a mobile network operator.

Example 26. The apparatus of any of examples 21 to 25, wherein the instructions, when executed by the at least one processor, cause the apparatus at least to: verify an integrity and freshness of at least a portion of the second message; and authenticate the client of the user, in response to a successful verification of the freshness and integrity of at least the portion of the second message.

Example 27. The apparatus of any of examples 20 to 26, wherein the instructions, when executed by the at least one processor, cause the apparatus at least to: request, from a certificate authority, a service provider certificate of a public key of the service provider signed by the certificate authority; and receive, from the certificate authority, the service provider certificate of the public key of the service provider signed by the certificate authority; wherein the encrypted subscription data associated with the service provider is encrypted using a public key of the user of the user device.

Example 28. The apparatus of any of examples 20 to 27, wherein the encrypted subscription data comprises a symmetric key between the service provider and the user, wherein the symmetric key is configured to be stored within the embedded universal integrated circuit card of the user device.

Example 29. The apparatus of any of examples 20 to 28, wherein the instructions, when executed by the at least one processor, cause the apparatus at least to: receive, from the user, a subscription request to subscribe to the service provider; and transmit, to a mobile network operator or a provisioning server, the request create the at least one sub-profile of the at least one profile stored within the embedded universal integrated circuit card of the user device of the user, in response to receiving the subscription request.

Example 30. The apparatus of any of examples 20 to 29, wherein the instructions, when executed by the at least one processor, cause the apparatus at least to: determine to revoke access to the service provider for the user; and transmit, to the mobile network operator, an encrypted request to revoke access to the service provider for the user.

Example 31. The apparatus of any of examples 20 to 30, wherein the service provider comprises a commodity service.

Example 32. An apparatus including: at least one processor; and at least one non-transitory memory storing instructions that, when executed by the at least one processor, cause the apparatus at least to: receive, from a service provider, a request to create at least one sub-profile of at least one profile stored within an embedded universal integrated circuit card of a user device; wherein the request to create the at least one sub-profile comprises a service provider certificate, a public key of the service provider, and encrypted subscription data; verify an integrity and freshness of the request to create the at least one sub-profile of the at least one profile stored within the embedded universal integrated circuit card of the user device; and forward, to a provisioning server or to a user equipment, the request to create the at least one sub-profile of the at least one profile stored within the embedded universal integrated circuit card of the user device, in response to successful verification of the integrity and freshness of the request to create the at least one sub-profile of the at least one profile stored within the embedded universal integrated circuit card of the user device; wherein the at least one sub-profile of the at least one profile stored within the embedded universal integrated circuit card of the user device is configured to be used to authenticate a user of the user device to the service provider with use of a symmetric key between the service provider and the user without involvement of a mobile network operator.

Example 33. The apparatus of example 32, wherein the instructions, when executed by the at least one processor, cause the apparatus at least to: encrypt the request to create the at least one sub-profile of the at least one profile stored within the embedded universal integrated circuit card of the user device forwarded to the user equipment using the symmetric key between the service provider and a user of the user device that is within the subscription data.

Example 34. The apparatus of any of examples 32 to 33, wherein the service provider comprises a commodity service.

Example 35. An embedded universal integrated circuit card including: at least one sub-profile of at least one profile stored within the embedded universal integrated circuit card; wherein the at least one sub-profile is configured to be used to authenticate a user of a user device to a service provider with use of a symmetric key between the service provider and the user without involvement of a mobile network operator; wherein the at least one sub-profile comprises subscription information related to a subscription of the user to the service provider; and a sub-profile companion applet comprising an interface to at least one software application of the user device, an interface to a software component that stores the symmetric key between the service provider and the user, and an interface to a software component used to provision and manage the at least one sub-profile.

Example 36. The embedded universal integrated circuit card of example 35, wherein the at least one profile stored within the embedded universal integrated circuit card comprises a profile of the mobile network operator.

Example 37. The embedded universal integrated circuit card of any of examples 35 to 36, wherein the software component that stores the symmetric key between the service provider and the user comprises an embedded universal integrated circuit card controlling authority security domain.

Example 38. The embedded universal integrated circuit card of any of examples 35 to 37, wherein the software component used to provision and manage the at least one sub-profile of the at least one profile comprises an issuer security domain root.

Example 39. The embedded universal integrated circuit card of any of examples 35 to 38, wherein: the sub-profile companion applet maintains information about a first sub-profile of an enabled issuer security domain profile stored within the embedded universal integrated circuit card; and the sub-profile companion applet maintains information about a second sub-profile of a disabled issuer security domain profile stored within the embedded universal integrated circuit card.

Example 40. The apparatus of any of examples 35 to 39, wherein the service provider comprises a commodity service.

Example 41. A method including: receiving, from a provisioning server, a request to create at least one sub-profile of at least one profile stored within an embedded universal integrated circuit card of an apparatus; wherein the request comprises encrypted subscription data comprising a symmetric key between a service provider and a user of the apparatus; storing the symmetric key within the embedded universal integrated circuit card of the apparatus; and creating the at least one sub-profile of the at least one profile stored within the embedded universal integrated circuit card of the apparatus; wherein the at least one sub-profile of the at least one profile stored within the embedded universal integrated circuit card of the apparatus is configured to be used to authenticate the user of the apparatus to the service provider with use of the symmetric key without involvement of a mobile network operator.

Example 42. A method including: generating a request to create at least one sub-profile of at least one profile stored within an embedded universal integrated circuit card of a user device; wherein the request to create the at least one sub-profile comprises a service provider certificate, a public key of a service provider, and encrypted subscription data associated with the service provider; and transmitting, to a mobile network operator or a provisioning server, the request to create the at least one sub-profile of the at least one profile stored within the embedded universal integrated circuit card of the user device; wherein the at least one sub-profile of the at least one profile stored within the embedded universal integrated circuit card of the user device is configured to be used to authenticate a user of the user device to the service provider without involvement of the mobile network operator.

Example 43. A method including: receiving, from a service provider, a request to create at least one sub-profile of at least one profile stored within an embedded universal integrated circuit card of a user device; wherein the request to create the at least one sub-profile comprises a service provider certificate, a public key of the service provider, and encrypted subscription data; verifying an integrity and freshness of the request to create the at least one sub-profile of the at least one profile stored within the embedded universal integrated circuit card of the user device; and forwarding, to a provisioning server or to a user equipment, the request to create the at least one sub-profile of the at least one profile stored within the embedded universal integrated circuit card of the user device, in response to successful verification of the integrity and freshness of the request to create the at least one sub-profile of the at least one profile stored within the embedded universal integrated circuit card of the user device; wherein the at least one sub-profile of the at least one profile stored within the embedded universal integrated circuit card of the user device is configured to be used to authenticate a user of the user device to the service provider with use of a symmetric key between the service provider and the user without involvement of a mobile network operator.

Example 44. A method including: storing at least one sub-profile of at least one profile stored within an embedded universal integrated circuit card; wherein the at least one sub-profile is configured to be used to authenticate a user of a user device to a service provider with use of a symmetric key between the service provider and the user without involvement of a mobile network operator; wherein the at least one sub-profile comprises subscription information related to a subscription of the user to the service provider; and implementing, with the embedded universal integrated circuit card, a sub-profile companion applet comprising an interface to at least one software application of the user device, an interface to a software component that stores the symmetric key between the service provider and the user, and an interface to a software component used to provision and manage the at least one sub-profile.

Example 45. An apparatus including: means for receiving, from a provisioning server, a request to create at least one sub-profile of at least one profile stored within an embedded universal integrated circuit card of the apparatus; wherein the request comprises encrypted subscription data comprising a symmetric key between a service provider and a user of the apparatus; means for storing the symmetric key within the embedded universal integrated circuit card of the apparatus; and means for creating the at least one sub-profile of the at least one profile stored within the embedded universal integrated circuit card of the apparatus; wherein the at least one sub-profile of the at least one profile stored within the embedded universal integrated circuit card of the apparatus is configured to be used to authenticate the user of the apparatus to the service provider with use of the symmetric key without involvement of a mobile network operator.

Example 46. An apparatus including: means for generating a request to create at least one sub-profile of at least one profile stored within an embedded universal integrated circuit card of a user device; wherein the request to create the at least one sub-profile comprises a service provider certificate, a public key of a service provider, and encrypted subscription data associated with the service provider; and means for transmitting, to a mobile network operator or a provisioning server, the request to create the at least one sub-profile of the at least one profile stored within the embedded universal integrated circuit card of the user device; wherein the at least one sub-profile of the at least one profile stored within the embedded universal integrated circuit card of the user device is configured to be used to authenticate a user of the user device to the service provider without involvement of the mobile network operator.

Example 47. An apparatus including: means for receiving, from a service provider, a request to create at least one sub-profile of at least one profile stored within an embedded universal integrated circuit card of a user device; wherein the request to create the at least one sub-profile comprises a service provider certificate, a public key of the service provider, and encrypted subscription data; means for verifying an integrity and freshness of the request to create the at least one sub-profile of the at least one profile stored within the embedded universal integrated circuit card of the user device; and means for forwarding, to a provisioning server or to a user equipment, the request to create the at least one sub-profile of the at least one profile stored within the embedded universal integrated circuit card of the user device, in response to successful verification of the integrity and freshness of the request to create the at least one sub-profile of the at least one profile stored within the embedded universal integrated circuit card of the user device; wherein the at least one sub-profile of the at least one profile stored within the embedded universal integrated circuit card of the user device is configured to be used to authenticate a user of the user device to the service provider with use of a symmetric key between the service provider and the user without involvement of a mobile network operator.

Example 48. An apparatus including: means for storing at least one sub-profile of at least one profile stored within an embedded universal integrated circuit card; wherein the at least one sub-profile is configured to be used to authenticate a user of a user device to a service provider with use of a symmetric key between the service provider and the user without involvement of a mobile network operator; wherein the at least one sub-profile comprises subscription information related to a subscription of the user to the service provider; and means for implementing, with the embedded universal integrated circuit card, a sub-profile companion applet comprising an interface to at least one software application of the user device, an interface to a software component that stores the symmetric key between the service provider and the user, and an interface to a software component used to provision and manage the at least one sub-profile.

Example 49. A computer readable medium including instructions stored thereon for performing at least the following: receiving, from a provisioning server, a request to create at least one sub-profile of at least one profile stored within an embedded universal integrated circuit card of an apparatus; wherein the request comprises encrypted subscription data comprising a symmetric key between a service provider and a user of the apparatus; storing the symmetric key within the embedded universal integrated circuit card of the apparatus; and creating the at least one sub-profile of the at least one profile stored within the embedded universal integrated circuit card of the apparatus; wherein the at least one sub-profile of the at least one profile stored within the embedded universal integrated circuit card of the apparatus is configured to be used to authenticate the user of the apparatus to the service provider with use of the symmetric key without involvement of a mobile network operator.

Example 50. A computer readable medium including instructions stored thereon for performing at least the following: generating a request to create at least one sub-profile of at least one profile stored within an embedded universal integrated circuit card of a user device; wherein the request to create the at least one sub-profile comprises a service provider certificate, a public key of a service provider, and encrypted subscription data associated with the service provider; and transmitting, to a mobile network operator or a provisioning server, the request to create the at least one sub-profile of the at least one profile stored within the embedded universal integrated circuit card of the user device; wherein the at least one sub-profile of the at least one profile stored within the embedded universal integrated circuit card of the user device is configured to be used to authenticate a user of the user device to the service provider without involvement of the mobile network operator.

Example 51. A computer readable medium including instructions stored thereon for performing at least the following: receiving, from a service provider, a request to create at least one sub-profile of at least one profile stored within an embedded universal integrated circuit card of a user device; wherein the request to create the at least one sub-profile comprises a service provider certificate, a public key of the service provider, and encrypted subscription data; verifying an integrity and freshness of the request to create the at least one sub-profile of the at least one profile stored within the embedded universal integrated circuit card of the user device; and forwarding, to a provisioning server or to a user equipment, the request to create the at least one sub-profile of the at least one profile stored within the embedded universal integrated circuit card of the user device, in response to successful verification of the integrity and freshness of the request to create the at least one sub-profile of the at least one profile stored within the embedded universal integrated circuit card of the user device; wherein the at least one sub-profile of the at least one profile stored within the embedded universal integrated circuit card of the user device is configured to be used to authenticate a user of the user device to the service provider with use of a symmetric key between the service provider and the user without involvement of a mobile network operator.

Example 52. A computer readable medium including instructions stored thereon for performing at least the following: storing at least one sub-profile of at least one profile stored within an embedded universal integrated circuit card; wherein the at least one sub-profile is configured to be used to authenticate a user of a user device to a service provider with use of a symmetric key between the service provider and the user without involvement of a mobile network operator; wherein the at least one sub-profile comprises subscription information related to a subscription of the user to the service provider; and implementing, with the embedded universal integrated circuit card, a sub-profile companion applet comprising an interface to at least one software application of the user device, an interface to a software component that stores the symmetric key between the service provider and the user, and an interface to a software component used to provision and manage the at least one sub-profile.

References to a 'computer', 'processor', etc. should be understood to encompass not only computers having different architectures such as single/multi-processor architectures and sequential or parallel architectures but also specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memories as described herein may be implemented using any suitable data storage technology, such as semiconductor based memory devices, flash memory, magnetic memory devices and systems, optical memory devices and systems, non-transitory memory, transitory memory, fixed memory and removable memory. The memories may comprise a database for storing data.

As used herein, the term 'circuitry' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memories that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

It should be understood that the foregoing description is only illustrative. Various alternatives and modifications may be devised by those skilled in the art. For example, features recited in the various dependent claims could be combined with each other in any suitable combination(s). In addition, features from different example embodiments described above could be selectively combined into a new example embodiment. Accordingly, this description is intended to embrace all such alternatives, modifications and variances which fall within the scope of the appended claims.

The following acronyms and abbreviations that may be found in the specification and/or the drawing figures are given as follows (the abbreviations and acronyms may be appended with each other or with other characters using e.g. a dash, hyphen, slash, or number, and may be case insensitive):

| | |
|---|---|
| σ | signature |
| 4G | fourth generation |
| 5G | fifth generation |
| 5GC | 5G core network |
| AKMA | authentication and key management for applications |
| AMF | access and mobility management function |

-continued

| | |
|---|---|
| ASIC | application-specific integrated circuit |
| BEST | battery efficient security for very low throughput |
| CA | certificate authority |
| CD | compact/computer disc |
| CPU | central processing unit |
| CS | commodity service |
| CU | central unit or centralized unit |
| del | delete |
| DSP | digital signal processor |
| DU | distributed unit |
| DVD | digital versatile disc |
| ECASD | eUICC controlling authority security domain |
| eNB | evolved Node B (e.g., an LTE base station) |
| Enc | encrypt |
| EN-DC | E-UTRAN new radio - dual connectivity |
| en-gNB | node providing NR user plane and control plane protocol terminations towards the UE, and acting as a secondary node in EN-DC |
| ES2+ | interface between the MNO and provisioning server |
| ES8+ | interface between the provisioning server and the eUICC |
| eSIM | embedded SIM |
| ETSI | European Telecommunications Standards Institute |
| eUICC | embedded universal integrated circuit |
| E-UTRA | evolved universal terrestrial radio access, i.e., the LTE radio access technology |
| E-UTRAN | E-UTRA network |
| F1 | interface between the CU and the DU |
| FIDO | fast identity online |
| FPGA | field-programmable gate array |
| GBA | generic bootstrapping architecture |
| gNB | base station for 5G/NR, i.e., a node providing NR user plane and control plane protocol terminations towards the UE, and connected via the NG interface to the 5GC |
| GSMA | Global System for Mobile Communications Association |
| HMAC | keyed-hash message authentication code or hash-based message authentication code |
| HW | hardware |
| IAB | integrated access and backhaul |
| ICCID | integrated circuit card ID |
| ID | identifier |
| I/F | interface |
| I/O | input/output |
| IMEI | international mobile equipment identity |
| IMSI | international mobile subscriber identity |
| IP | internet protocol |
| ISD-P | issuer security domain - profile |
| ISD-R | issuer security domain - root |
| iSIM | integrated SIM |
| LMF | location management function |
| Log | login |
| LTE | long term evolution (4G) |
| M2M | machine-to-machine |
| MAC | medium access control |
| MME | mobility management entity |
| MNO | mobile network operator |
| MRO | mobility robustness optimization |
| MSISDN | mobile station international subscriber directory number |
| MSS | mobile signature service |
| NCE | network control element |
| NF | network function |
| ng or NG | new generation |
| ng-eNB | new generation eNB |
| NG-RAN | new generation radio access network |
| NR | new radio |
| N/W | network |
| OS | operating system |
| PC | personal computer |
| PDA | personal digital assistant |
| PDCP | packet data convergence protocol |
| PHY | physical layer |
| PKE | public key enablement, or public key encryption |
| PKI | public key infrastructure |
| PIN | personal identification number |
| Pub | publish or publishing |
| RAM | random access memory |
| RAN | radio access network |
| req | request |
| RLC | radio link control |
| ROM | read-only memory |

-continued

| | |
|---|---|
| RRC | radio resource control |
| RSP | remote SIM provisioning |
| RU | radio unit |
| Rx | receiver or reception |
| SAM | secured applications for mobile |
| SAT | SIM application toolkit |
| SDAP | service data adaptation protocol |
| SGW | serving gateway |
| SIM | subscriber identity module |
| SIMBA | SIM-based authentication |
| SKE | symmetric key encryption |
| SM | subscription manager |
| SM-DP+ | subscription manager data preparation |
| SMF | session management function |
| SMS | short message service |
| SON | self-organizing/optimizing network |
| SPTP | SIM profile transparency protocol |
| STK | SIM application toolkit |
| SP | sub-profile |
| SP_ID | sub-profile ID |
| Sub | subscribe, subscribing, or subscription |
| TLS | transport layer security |
| TRP | transmission reception point |
| Tx, TX | transmitter or transmission |
| UAV | unmanned aerial vehicle |
| UE | user equipment (e.g., a wireless, typically mobile |
| UI | user interface |
| UPF | user plane function |
| USB | universal serial bus |
| X2 | network interface between RAN nodes and between RAN and the core network |
| Xn | network interface between NG-RAN nodes |

What is claimed is:

1. An apparatus comprising:

at least one processor; and at least one non-transitory memory storing instructions that, when executed by the at least one processor, cause the apparatus at least to:

receive, from a provisioning server, a request to create at least one sub-profile of at least one profile stored within an embedded universal integrated circuit card of the apparatus;

wherein the request comprises encrypted subscription data comprising a symmetric key between a service provider and a user of the apparatus;

store the symmetric key within the embedded universal integrated circuit card of the apparatus;

create the at least one sub-profile of the at least one profile stored within the embedded universal integrated circuit card of the apparatus;

wherein the at least one sub-profile of the at least one profile stored within the embedded universal integrated circuit card of the apparatus is configured to be used to authenticate the user of the apparatus to the service provider with use of the symmetric key without involvement of a mobile network operator; and communicate, using a sub-profile companion applet of the embedded universal integrated circuit card, with at least one software component of the embedded universal integrated circuit card and at least one software application of the apparatus.

2. The apparatus of claim 1, wherein the instructions, when executed by the at least one processor, cause the apparatus at least to:

receive, from the service provider with a service provider application of the apparatus, a first message associated with a request of the user to log in to the service provider and a generated personal identification number;

wherein the first message comprises an encryption of a first application identifier and an encryption of the generated personal identification number;

generate, using the service provider application of the apparatus, a second message comprising a second application identifier appended to the first message;

forward, using the service provider application of the apparatus, the second message to the embedded universal integrated circuit card;

verify, with a sub-profile companion applet of the embedded universal integrated circuit card using the stored symmetric key between the service provider and the user of the apparatus, an integrity and freshness of the first message, based on the forwarded second message; and determine to deny the user access to the service provider, in response to the sub-profile companion applet failing to verify the integrity and freshness of the first message.

3. The apparatus of claim 2, wherein the instructions, when executed by the at least one processor, cause the apparatus at least to:

retrieve the stored symmetric key between the service provider and the user of the apparatus from an embedded universal integrated circuit card controlling authority security domain.

4. The apparatus of claim 2, wherein the instructions, when executed by the at least one processor, cause the apparatus at least to:

receive, from the user, a unique identifier of the user and the generated personal identification number;

generate the request of the user to log in to the service provider, the request comprising the unique identifier of the user and the generated personal identification number; and transmit, to the service provider, the request of the user to log in to the service provider;

wherein the first application identifier is based on mapping between the unique identifier of the user and the first application identifier.

5. The apparatus of claim 2, wherein:

the symmetric key is not known to the service provider application of the apparatus, and the generated personal identification number is not visible to the service provider application of the apparatus, or the symmetric key is not able to be decrypted by the service provider application of the apparatus, and the generated personal identification number is not visible to the service provider application of the apparatus.

6. The apparatus of claim 2, wherein the instructions, when executed by the at least one processor, cause the apparatus at least to:

determine, using the sub-profile companion applet, whether the first application identifier matches the second application identifier;

determine to deny the user access to the service provider, in response to the first application identifier not matching the second application identifier; and forward, from the sub-profile companion applet to the service provider application of the apparatus, an accept message, in response to the first application identifier matching the second application identifier;

wherein the accept message comprises the generated personal identification number encrypted with the symmetric key between the service provider and the user of the apparatus.

7. The apparatus of claim 6, wherein the instructions, when executed by the at least one processor, cause the apparatus at least to:

encrypt the generated personal identification number with the symmetric key between the service provider and the user of the apparatus; and generate the accept message, including within the accept message the generated personal identification number encrypted with the symmetric key between the service provider and the user of the apparatus.

8. The apparatus of claim 6, wherein the instructions, when executed by the at least one processor, cause the apparatus at least to:

generate, with the service provider application, a request for the user to enter a user personal identification number;

determine to deny the user access to the service provider, in response to the user failing to enter the user personal identification number or mistyping the user personal identification number for a number of attempts to enter the user personal identification number;

generate a third message comprising the user personal identification number appended to the accept message; and forward the third message to the service provider, wherein the third message is configured to be used with the service provider to authenticate the user.

9. The apparatus of claim 1, wherein the instructions, when executed by the at least one processor, cause the apparatus at least to:

receive, from the user, a unique identifier of the user;

generate a personal identification number;

present the personal identification number to the user; and transmit, to a server of the service provider, the unique identifier of the user and the generated personal identification number.

10. The apparatus of claim 1, wherein the instructions, when executed by the at least one processor, cause the apparatus at least to:

retrieve a private key of the user;

decrypt the encrypted subscription data; and store the decrypted subscription data within the at least one profile of the embedded universal integrated circuit card.

11. The apparatus of claim 1, wherein the encrypted subscription data is not able to be decrypted by the provisioning server or the mobile network operator.

12. The apparatus of claim 1, wherein the instructions, when executed by the at least one processor, cause the apparatus at least to:

verify an integrity and freshness of the request to create the sub-profile within the at least one profile stored within the embedded universal integrated circuit card;

wherein the at least one sub-profile is created within the at least one profile of the embedded universal integrated circuit card, in response to the integrity and freshness of the request to create the sub-profile within the at least one profile stored within the embedded universal integrated circuit card being verified.

13. The apparatus of claim 1, wherein the at least one profile stored within the embedded universal integrated circuit card comprises a profile of the mobile network operator.

14. The apparatus of claim 1, wherein the instructions, when executed by the at least one processor, cause the apparatus at least to:

maintain, using a sub-profile companion applet of the embedded universal integrated circuit card, information about a first sub-profile of an enabled issuer security domain profile stored within the embedded universal integrated circuit card; and maintain, using the sub-profile companion applet of the embedded universal integrated circuit card, information about a second sub-profile of a disabled issuer security domain profile stored within the embedded universal integrated circuit card.

15. The apparatus of claim 1, wherein the instructions, when executed by the at least one processor, cause the apparatus at least to:

transmit, to the service provider, a request to subscribe the user to the service provider;

wherein the at least one sub-profile of the at least one profile stored within the embedded universal integrated circuit card of the apparatus is created in response to the user being subscribed to the service provider; and store a service provider application within the apparatus, in response to the user being subscribed to the service provider.

16. The apparatus of claim 1, wherein the at least one software component comprises at least one of:

an issuer security domain root, or an embedded universal integrated circuit card controlling authority security domain.

17. The apparatus of claim 1, wherein the sub-profile companion applet does not have a communication interface that allows direct connection outside the apparatus to a cellular network or the mobile network operator.

18. The apparatus of claim 1, wherein the service provider comprises a commodity service.

19. An apparatus comprising:

at least one processor; and at least one non-transitory memory storing instructions that, when executed by the at least one processor, cause the apparatus at least to:

generate a request to create at least one sub-profile of at least one profile stored within an embedded universal integrated circuit card of a user device;

wherein the request to create the at least one sub-profile comprises a service provider certificate, a public key of a service provider, and encrypted subscription data associated with the service provider; and transmit, to a mobile network operator or a provisioning server, the request to create the at least one sub-profile of the at least one profile stored within the embedded universal integrated circuit card of the user device;

wherein the at least one sub-profile of the at least one profile stored within the embedded universal integrated circuit card of the user device is configured to be used to authenticate a user of the user device to the service provider without involvement of the mobile network operator; and communicate, using a sub-profile companion applet of the embedded universal integrated circuit card, with at least one software component of the embedded universal integrated circuit card and at least one software application of the apparatus.

20. The apparatus of claim 19, wherein the instructions, when executed by the at least one processor, cause the apparatus at least to:

receive, from a client of the user of the user device, a request for the user to log in to the service provider, wherein the request comprises a unique identifier of the user and a generated personal identification number;

determine an application identifier associated with a service provider application of the user device, based on a mapping between the unique identifier of the user and the application identifier associated with the service provider application of the user device, the mapping stored in a database associated with the apparatus;

encrypt the generated personal identification number and the application identifier associated with the service provider application of the user device, using a symmetric key between the service provider and the user;

transmit, to the service provider application of the user device, a first message comprising the encrypted generated personal identification number and the encrypted application identifier;

receive, from the service provider application of the user device, a second message comprising a user personal identification number entered by the user;

determine whether the generated personal identification number matches the user personal identification number entered by the user; and authenticate the client of the user, in response to the generated personal identification number matching the user personal identification number entered by the user.

21. The apparatus of claim 20, wherein authenticating the client of the user comprises granting to the client of the user access to a service provided with the service provider.

22. The apparatus of claim 20, wherein the instructions, when executed by the at least one processor, cause the apparatus at least to:

retrieve, from a local database, the symmetric key between the service provider and the user, based on the unique identifier of the user.

23. The apparatus of claim 20, wherein the instructions, when executed by the at least one processor, cause the apparatus at least to:

retrieve, from an embedded universal integrated circuit card controlling authority security domain, the symmetric key between the service provider and the user.

24. The apparatus of claim 20, wherein the instructions, when executed by the at least one processor, cause the apparatus at least to:

authenticate the client of the user to the service provider without use of a password and without use of a mobile network operator.

25. The apparatus of claim 20, wherein the instructions, when executed by the at least one processor, cause the apparatus at least to:

verify an integrity and freshness of at least a portion of the second message; and authenticate the client of the user, in response to a successful verification of the freshness and integrity of at least the portion of the second message.

26. The apparatus of claim 19, wherein the instructions, when executed by the at least one processor, cause the apparatus at least to:

request, from a certificate authority, a service provider certificate of a public key of the service provider signed by the certificate authority; and receive, from the certificate authority, the service provider certificate of the public key of the service provider signed by the certificate authority;

wherein the encrypted subscription data associated with the service provider is encrypted using a public key of the user of the user device.

27. The apparatus of claim 19, wherein the encrypted subscription data comprises a symmetric key between the service provider and the user, wherein the symmetric key is configured to be stored within the embedded universal integrated circuit card of the user device.

28. The apparatus of claim 19, wherein the instructions, when executed by the at least one processor, cause the apparatus at least to:

receive, from the user, a subscription request to subscribe to the service provider; and transmit, to a mobile network operator or a provisioning server, the request create the at least one sub-profile of the at least one profile stored within the embedded universal integrated circuit card of the user device of the user, in response to receiving the subscription request.

29. The apparatus of claim 19, wherein the instructions, when executed by the at least one processor, cause the apparatus at least to:

determine to revoke access to the service provider for the user; and transmit, to the mobile network operator, an encrypted request to revoke access to the service provider for the user.

30. The apparatus of claim 19, wherein the service provider comprises a commodity service.

31. An apparatus comprising:

at least one processor; and at least one non-transitory memory storing instructions that, when executed by the at least one processor, cause the apparatus at least to:

receive, from a service provider, a request to create at least one sub-profile of at least one profile stored within an embedded universal integrated circuit card of a user device;

wherein the request to create the at least one sub-profile comprises a service provider certificate, a public key of the service provider, and encrypted subscription data;

verify an integrity and freshness of the request to create the at least one sub-profile of the at least one profile stored within the embedded universal integrated circuit card of the user device; and forward, to a provisioning server or to a user equipment, the request to create the at least one sub-profile of the at least one profile stored within the embedded universal integrated circuit card of the user device, in response to successful verification of the integrity and freshness of the request to create the at least one sub-profile of the at least one profile stored within the embedded universal integrated circuit card of the user device;

wherein the at least one sub-profile of the at least one profile stored within the embedded universal integrated circuit card of the user device is configured to be used to authenticate a user of the user device to the service provider with use of a symmetric key between the service provider and the user without involvement of a mobile network operator; and communicate, using a sub-profile companion applet of the embedded universal integrated circuit card, with at least one software component of the embedded universal integrated circuit card and at least one software application of the apparatus.

32. The apparatus of claim 31, wherein the instructions, when executed by the at least one processor, cause the apparatus at least to:

encrypt the request to create the at least one sub-profile of the at least one profile stored within the embedded universal integrated circuit card of the user device forwarded to the user equipment using the symmetric key between the service provider and a user of the user device that is within the subscription data.

33. The apparatus of claim 31, wherein the service provider comprises a commodity service.

34. An embedded universal integrated circuit card comprising:

at least one sub-profile of at least one profile stored within the embedded universal integrated circuit card;

wherein the at least one sub-profile is configured to be used to authenticate a user of a user device to a service provider with use of a symmetric key between the service provider and the user without involvement of a mobile network operator;

wherein the at least one sub-profile comprises subscription information related to a subscription of the user to the service provider; and a sub-profile companion applet comprising an interface to at least one software application of the user device, an interface to a software component that stores the symmetric key between the service provider and the user, and an interface to a software component used to provision and manage the at least one sub-profile.

35. The embedded universal integrated circuit card of claim 34, wherein the at least one profile stored within the embedded universal integrated circuit card comprises a profile of the mobile network operator.

36. The embedded universal integrated circuit card of claim 34, wherein the software component that stores the symmetric key between the service provider and the user comprises an embedded universal integrated circuit card controlling authority security domain.

37. The embedded universal integrated circuit card of claim 34, wherein the software component used to provision and manage the at least one sub-profile of the at least one profile comprises an issuer security domain root.

38. The embedded universal integrated circuit card of claim 34, wherein:

the sub-profile companion applet maintains information about a first sub-profile of an enabled issuer security domain profile stored within the embedded universal integrated circuit card; and the sub-profile companion applet maintains information about a second sub-profile of a disabled issuer security domain profile stored within the embedded universal integrated circuit card.

39. The apparatus of claim 34, wherein the service provider comprises a commodity service.

* * * * *